(12) United States Patent
Lin et al.

(10) Patent No.: US 8,663,799 B2
(45) Date of Patent: *Mar. 4, 2014

(54) POLYPROPYLENE BASED FIBERS AND NONWOVENS

(75) Inventors: Chon Yie Lin, Houston, TX (US); Bryan Robert Chapman, Annandale, NJ (US); Chia Yung Cheng, Seabrook, TX (US); William Michael Ferry, Houston, TX (US); Michael Brian Kelly, Kingwood, TX (US); Bruce Robert Lundmark, Waller, TX (US); Wen Li, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 367 days.

This patent is subject to a terminal disclaimer.

(21) Appl. No.: 13/175,201

(22) Filed: Jul. 1, 2011

(65) Prior Publication Data

US 2011/0253152 A1  Oct. 20, 2011

Related U.S. Application Data

(63) Continuation of application No. 11/119,193, filed on Apr. 29, 2005, now Pat. No. 7,998,579, which is a continuation-in-part of application No. 10/782,306, filed on Feb. 19, 2004, now Pat. No. 7,271,209, which is a continuation-in-part of application No. 10/640,435, filed on Aug. 12, 2003, now Pat. No. 7,619,026, which is a continuation-in-part of application No. 10/634,351, filed on Aug. 4, 2003, now Pat. No. 7,632,887.

(60) Provisional application No. 60/402,665, filed on Aug. 12, 2002, provisional application No. 60/637,429, filed on Dec. 17, 2004, provisional application No. 60/655,612, filed on Feb. 22, 2005, provisional application No. 60/655,310, filed on Feb. 22, 2005.

(51) Int. Cl.
*B32B 27/32* (2006.01)

(52) U.S. Cl.
USPC ........... 428/364; 428/373; 428/374; 442/327; 442/361

(58) Field of Classification Search
None
See application file for complete search history.

(56) References Cited

U.S. PATENT DOCUMENTS

| | | | | |
|---|---|---|---|---|
| 7,271,209 | B2 * | 9/2007 | Li et al. | 524/284 |
| 7,629,416 | B2 * | 12/2009 | Li et al. | 525/191 |
| 7,652,093 | B2 * | 1/2010 | Yang et al. | 524/491 |
| 7,998,579 | B2 * | 8/2011 | Lin et al. | 428/394 |
| 8,202,942 | B2 * | 6/2012 | Li et al. | 525/191 |
| 2006/0008643 | A1 * | 1/2006 | Lin et al. | 428/364 |
| 2011/0253152 | A1 * | 10/2011 | Lin et al. | 128/849 |
| 2011/0269362 | A1 * | 11/2011 | Li et al. | 442/327 |

* cited by examiner

*Primary Examiner* — Jill Gray

(74) *Attorney, Agent, or Firm* — Jamie L. Sullivan; Kevin M. Faulkner

(57) ABSTRACT

The present invention relates to fibers and nonwovens made from plasticized polyolefin compositions comprising a polyolefin, a non-functionalized hydrocarbon plasticizer and a slip agent.

29 Claims, No Drawings

POLYPROPYLENE BASED FIBERS AND NONWOVENS

PRIORITY CLAIM

This application is a continuation of U.S. Ser. No. 11/119,193, filed Apr. 29, 2005, now U.S. Pat. No. 7,998,579 which is a continuation in part of (1) U.S. Ser. No. 10/782,306 (now U.S. Pat. No. 7,271,209), filed Feb. 19, 2004, which is a continuation in part of (2) U.S. Ser. No. 10/640,435 (now U.S. Pat. No. 7,619,026) filed Aug. 12, 2003, which is a continuation in part of (3) U.S. Ser. No. 10/634,351 (now U.S. Pat. No. 7,632,887 filed Aug. 4, 2003, all of which claim priority to and the benefit of U.S. Ser. No. 60/402,665 filed on Aug. 12, 2002.

This application also claims the benefit of 60/637,429, filed Dec. 17, 2004; 60/655,612, filed Feb. 22, 2005 and 60/655,310, filed Feb. 22, 2005.

FIELD OF THE INVENTION

The present invention relates to polyolefin compositions and articles produced from polyolefins, such as fibers, nonwovens, molded and extruded goods, comprising polypropylene, a modifier, typically a liquid modifier, and a slip additive. The invention also relates to an additive for polyolefins comprising a blend of a modifier, typically a liquid modifier, and a slip agent.

BACKGROUND OF THE INVENTION

Polypropylene is conventionally used to produce fibers and spunbond nonwovens for a wide range of articles, such as, for example, disposable hygiene goods including diapers, sanitary napkins, training pants, adult incontinence products, hospital gown, baby wipes, moist towelettes, cleaner cloths, and the like. The typical polypropylene nonwoven fabric tends to be stiff and plastic-like when compared to woven fabrics. There is a general interest to impart cloth-like softness to polypropylene nonwoven fabrics, particularly for applications requiring improved tactile and skin contact feeling.

It is difficult to make polypropylene fibers and nonwovens with good softness or drapablity, sometimes referred to in the art as "total hand" or more recently in U.S. Pat. No. 6,632,385 and U.S. Pat. No. 6,803,103, as "condrapability." As used herein, the term "condrapability" designates an attribute combining the aesthetic tactile parameters of hand (or handle) and drapability. "Hand" refers to the organoleptic feel of a fabric as the fingers experience it when moved parallel over the fabric surface. It is generally considered as a combination of both smoothness and softness, although materials that are only smooth such as glass and materials that are only soft such as some polypropylene films can have poor hand. "Drapability" relates to the ability of a fabric to be folded or crushed. Conveniently, hand may be thought of as related to the external or surface friction of a fabric, and drapability may be thought of as related to the internal or fiber-to-fiber friction of the fabric.

The well known Handle-O-Meter test procedure (INDA IST 90.3-95) provides a reliable quantitative measurement of condrapability which correlates well with organoleptic test panel results. It is variously referred to in the art as a measure of hand, total hand, softness, drapability, flexibility and the like. However, it measures both the hand or external friction effect and the drapability or internal friction effect. The Handle-O-Meter measures the force required to push a fabric through a slot opening with a blade approximately the same length as the opening. A fabric specimen of given dimensions is placed on the instrument platform consisting of two thin metal plates which form a slot 0.25 in. (6.4 mm) in width for webs having a basis weight of 5 to 100 grams per square meter (gsm). A machine direction (MD) or cross-machine direction (CD) centerline of the fabric specimen is aligned across the slot and/or penetrating blade used to force the specimen into the slot. The force required to do this is measured and reported in grams of force. The test is repeated with the fabric specimen re-oriented 90 degrees. The results typically reported are averages of the results with the fabric extending across the slot in the MD and in the CD. The tests are normally made on both sides for a two-sided material. Variations in structural or formation uniformity can frequently affect the Handle-O-Meter test results, which are therefore typically averaged for several readings.

The more condrapable the fabric, the more easily it moves through the slot under the influence of the blade. The test results reflect both the drapability of the material (the ease with which it is folded or crushed by the blade to pass through the slot) and the hand of the material (the ease with which the friction generated between the moving fabric and the stationary slot is overcome). The less force required to push the fabric through the slot, the lower the test reading and the more condrapable the fabric. As used herein, a web is characterized as having a "substantial improvement in condrapability" where it has a Handle-O-Meter decrease of at least 15% average for MD and CD relative to the initial condrapability, preferably at least 25%, more preferably at least 40%, where the particular slot width is appropriately selected for the weight of the web.

Addition of a slip agent to polyolefin films and webs is known to reduce the coefficient of friction of the polyolefin surface. Typical slip agents have included various compounds that can be applied in an aqueous solution or other solvent to the surface of the polyolefin article, and/or blended into the polyolefin in sufficiently high concentration to affect the surface properties of the polyolefin article, such as, for example, functionalized oils and oil derivatives; waxes; fluoro-containing polymers; silicon compounds; and the like. The application of a solution or dispersion of the slip agent to a polyolefin article, of course, can suffer the disadvantage of requiring additional fabrication processing steps such as preparation of the solution or dispersion, spraying or otherwise applying the solution to the polymer surface, and drying the polymer surface to remove the solvent. See U.S. Pat. No. 6,632,385 and U.S. Pat. No. 6,803,103 which are hereby incorporated herein by reference for purposes of US patent practice.

On the other hand, when blended into the polymer with other additives conventionally added during processing of the polymer into a film, some lubricants such as mineral oils, for example, tend to be retained in the polyolefin where they may adversely affect desirable polymer properties and may require relatively high concentrations, from several percent up to 10 percent by weight of the polymer composition or more, before surface slip properties are affected. Moreover, such additives can suffer the disadvantages of odor and/or excessive bleed, resulting in an undesirable buildup of the additive on the polymer surface and equipment and processing surfaces with which it comes in contact. Other blended slip agents can be used in very low concentrations, such as, for example, usually less than 1 percent or commonly less than 0.25 percent by weight of the polymer composition, because they bloom quickly to the film surface and typically provide maximum slip in a matter of hours, usually having most of the ultimate slip effect in less than 100 hours after forming the film. See Maltby and Marquis ("Slip Additives for Film Extrusion," *Journal of Plastic Film & Sheeting*, vol. 14, pp. 111-120 (April 1998)). These slip agents useful at such low concentrations are referred to herein as "fast bloom" slip agents.

Other references of interest regarding slip agents and similar additives in polypropylene films include JP 11012402, GB 1108298, US 2004/030287, EP 240563, U.S. Pat. No. 4,604,322, U.S. Pat. No. 5,482,780, EP 774347, US 2002/050124, JP 08067782, and US 2003/036592.

All slip additives will normally reach a point where adding more slip agent to the polymer has diminished returns and eventually no further improvement of properties is obtained by increasing the slip agent concentration. On the other hand, the performance of a slip agent in combination with another polymer additive is in many cases worse and at best unpredictable. For example, Maltby and Marquis report that the coefficient of friction increased in an LDPE film containing an erucamide slip agent when a silica antiblocking agent is added, and at higher antiblocking concentrations the slip agent seemed to have no effect; and that in polypropylene films made from blends with stearamide and erucamide, the coefficient of friction increased when a smaller size silica was used in the PP-erucamide blend but the opposite effect was observed in the PP-stearamide blend.

Addition of a plasticizer or other substance to a polyolefin is one way known to improve impact strength and toughness, among other properties. Some patent disclosures directed to such an end are U.S. Pat. No. 4,960,820; U.S. Pat. No. 4,132,698; U.S. Pat. No. 3,201,364; WO 02/31044; WO 01/18109 A1; and EP 0 300 689 A2. These disclosures are directed to polyolefins and elastomers blended with functionalized plasticizers. The functionalized plasticizers are materials such as mineral oils which contain aromatic groups, and high (greater than −20° C.) pour point compounds. Use of these compounds typically does not preserve the transparency of the polyolefin, and impact strength is often not improved.

WO 2004/014998 discloses blends of polypropylenes with various non-functional plasticizers.

What is needed is a polyolefin with improved condrapability, as well as lower flexural modulus, and lower glass transition temperature, while not materially influencing the peak melting temperature of the polyolefin, the polyolefin crystallization rate, or its clarity, and with minimal migration of plasticizer to the surface of fabricated articles. Furthermore, the polyolefin composition should preferably be capable of preparation by melt blending any additives with the polyolefin in order to avoid additional processing steps needed for surface application. A condrapable, plasticized polyolefin according to this invention can fulfill these needs. More specifically, there is a need for a condrapable, plasticized polypropylene that can be used in such applications as fibers and nonwovens for disposable fabrics.

Likewise, a plasticized polyolefin with improved condrapability (lower Handle-O-Meter readings), better flexibility (lower flexural modulus), and a depressed glass transition temperature, where the melting temperature of the polyolefin, the polyolefin crystallization rate, or its clarity are not influenced and with minimal migration of the plasticizer to the surface of articles made therefrom without adverse interaction with the slip agent, is desirable.

It would be particularly desirable to plasticize and impart condrapability to polyolefins by using a simple, non-reactive compound such as paraffin. However, it has been taught that aliphatic or paraffinic compounds would impair the properties of polyolefins, and was thus not recommended. (See, e.g., CHEMICAL ADDITIVES FOR PLASTICS INDUSTRY 107-116 (Radian Corp., Noyes Data Corporation, NJ 1987); WO 01/18109 A1.

Mineral oils, which have been used as extenders, softeners, slip agents and the like in various applications, consist of thousands of different compounds, many of which are undesirable in a lubricating system. Under moderate to high temperatures these compounds can volatilize and oxidize, even with the addition of oxidation inhibitors.

Certain mineral oils, distinguished by their viscosity indices and the amount of saturates and sulfur they contain, have been classified as Hydrocarbon Basestock Group I, II or III by the American Petroleum Institute (API). Group I basestocks are solvent refined mineral oils. They contain the most unsaturates and sulfur and have the lowest viscosity indices. They define the bottom tier of lubricant performance. Group I basestocks are the least expensive to produce, and they currently account for abut 75 percent of all basestocks. These comprise the bulk of the "conventional" basestocks. Groups II and III are the High Viscosity Index and Very High Viscosity Index basestocks. They are hydroprocessed mineral oils. The Group III oils contain less unsaturates and sulfur than the Group I oils and have higher viscosity indices than the Group II oils do. Additional basestocks, named Groups IV and V, are also used in the basestock industry. Rudnick and Shubkin (*Synthetic Lubricants and High-Performance Functional Fluids*, Second edition, Rudnick, Shubkin, eds., Marcel Dekker, Inc. New York, 1999) describe the five basestock Groups as typically being:

Group 1—mineral oils refined using solvent extraction of aromatics, solvent dewaxing, hydrofining to reduce sulfur content to produce mineral oils with sulfur levels greater than 0.03 weight %, saturate levels of 60 to 80% and a viscosity index (VI) of about 90;

Group II—mildly hydrocracked mineral oils with conventional solvent extraction of aromatics, solvent dewaxing, and more severe hydrofining to reduce sulfur levels to less than or equal to 0.03 weight % as well as removing double bonds from some of the olefinic and aromatic compounds, saturate levels are greater than 95-98% and VI is about 80-120;

Group III—severely hydrotreated mineral oils with saturate levels of some oils virtually 100%, sulfur contents are less than or equal to 0.03 weight % (preferably between 0.001 and 0.01%) and VI is in excess of 120;

Group IV—poly-alpha-olefins—hydrocarbons manufactured by the catalytic oligomerization of linear olefins having 6 or more carbon atoms. In industry however, the Group IV basestocks referred to as "polyalphaolefins" are generally thought of as a class of synthetic basestock fluids produced by oligomerizing $C_4$ and greater alphaolefins; and Group V—esters, polyethers, polyalkylene glycols, and includes all other basestocks not included in Groups I, II, III and IV.

Other background references include WO 98/44041, EP 0 448 259 A, EP 1 028 145 A, U.S. Pat. Nos. 4,073,782, and 3,415,925. Other references of interest include: U.S. Pat. No. 5,869,555; U.S. Pat. No. 4,210,570; U.S. Pat. No. 4,110,185; GB 1,329,915; U.S. Pat. No. 3,201,364; U.S. Pat. No. 4,536,537; U.S. Pat. No. 4,774,277; JP01282280; FR2094870; JP69029554; *Rubber Technology Handbook*, Werner Hoffman, Hanser Publishers, New York, 1989, pg 294-305; *Additives for Plastics*, J. Stepek, H. Daoust, Springer Verlag, New York, 1983, pg-6-69.

SUMMARY OF THE INVENTION

This invention broadly relates to polyolefin compositions comprising one or more polyolefins, one or more nonfunctionalized modifiers, and one or more functionalized slip additives.

This invention relates to fibers and nonwoven articles comprising condrapable, plasticized polyolefin compositions comprising one or more polyolefins, one or more hydrocarbon fluids, and one or more functionalized slip additives.

This invention also relates to additive blends for polyolefins comprising one or more nonfunctionalized modifiers, and one or more functionalized slip additives.

This invention also relates to a fiber comprising a polyolefin composition comprising one or more polyolefins, one or more non-functionalized plasticizers, and a slip agent in addition to the one or more non-functionalized plasticizers where the non-functionalized plasticizer has a viscosity index of 120 or more and a pour point of −10° C. or less.

DEFINITIONS

For purposes of this invention and the claims thereto when a polymer or oligomer is referred to as comprising an olefin, the olefin present in the polymer or oligomer is the polymerized or oligomerized form of the olefin, respectively. Likewise the use of the term polymer is meant to encompass homopolymers and copolymers. In addition the term copolymer includes any polymer having 2 or more monomers. Thus, as used herein, the term "polypropylene" means a polymer made of at least 50% propylene units, preferably at least 70% propylene units, more preferably at least 80% propylene units, even more preferably at least 90% propylene units, even more preferably at least 95% propylene units or 100% propylene units.

For purposes of this invention an oligomer is defined to have an Mn of less than 21,000 g/mol, preferably less than 20,000 g/mol, preferably less than 19,000 g/mol, preferably less than 18,000 g/mol, preferably less than 16,000 g/mol, preferably less than 15,000 g/mol, preferably less than 13,000 g/mol, preferably less than 10,000 g/mol, preferably less than 5000 g/mol, preferably less than 3000 g/mol.

For purposes of this invention and the claims thereto Group I, II, and III basestocks are defined to be mineral oils having the following properties:

|  | Saturates (wt %) | Sulfur (wt %) | Viscosity Index |
|---|---|---|---|
| Group I | <90 &/or | >0.03% & | ≥80 & <120 |
| Group II | ≥90 & | ≤0.03% & | ≥80 & <120 |
| Group III | ≥90 & | ≤0.03% & | ≥120 |

Wt % saturates, wt % sulfur, and Viscosity Index are measured following ASTM D2007, ASTM D2622, and ASTM D2270, respectively.

For purposes of this invention and the claims thereto Group IV basestocks are defined to be "polyalphaolefins," which are hydrocarbon liquids manufactured by the catalytic oligomerization or polymerization of linear alpha-olefins having 5 or more carbon atoms, preferably 6 or more carbon atoms, preferably 8 or more carbon atoms. The polyalphaolefins may be characterized by any degree of tacticity, including isotacticity or syndiotacticity, and/or may be atactic. In another embodiment the polyalphaolefin has more than 50% meso dyads as measured by $^{13}$Carbon NMR, preferably more than 60%. In another embodiment the polyalphaolefin has more than 50% racemic dyads as measured by $^{13}$Carbon NMR, preferably more than 60%.

For purposes of the present invention and description herein, the term "paraffin" includes all isomers such as n-paraffins, branched paraffins, isoparaffins, cycloparaffins, and may include cyclic aliphatic species, and blends thereof, and may be derived synthetically by means known in the art, or from refined crude oil in such a way as to meet the requirements described for desirable modifiers described herein. By isoparaffin is meant that the paraffin chains possess $C_1$ to $C_{18}$ alkyl branching along at least a portion of each paraffin chain; and more particularly, isoparaffins are saturated aliphatic hydrocarbons whose molecules have at least one carbon atom bonded to at least three other carbon atoms or at least one side chain (i.e., a molecule having one or more tertiary or quaternary carbon atoms). Isoparaffins may also include cycloparaffins with branched side chains, generally as a minor component of the isoparaffin. Isoparaffins with multiple alkyl branches may include any combination of regio and stereo placement of those branches.

For purposes of the present invention and the claims thereto, the term "mineral oil" includes any petroleum-based oil; derived from petroleum crude oil that has been subjected to refining steps (such as distillation, solvent processing, hydroprocessing, and/or dewaxing) to achieve the final oil. This also includes petroleum-based oils that are extensively purified and/or modified through severe processing treatments. For purposes of this invention and the claims thereto synthetic oils are those oils that have been manufactured by combining monomer units using catalysts and/or heat.

For purposes of this invention and the claims thereto the amount of modifier in a given composition is determined by the approach described below under Test Methods.

For purposes of this invention and the claims thereto when melting point is referred to and there is a range of melting temperatures, the melting point is defined to be the peak melting temperature from a differential scanning calorimetry (DSC) trace as described below under Test Methods, and when there is more than one melting peak, it refers to the peak melting temperature for the largest peak among principal and secondary melting peaks, as opposed to the peak occurring at the highest temperature, thereby reflecting the largest contribution to the calorimetric response of the material.

DETAILED DESCRIPTION OF THE INVENTION

This invention relates to articles formed from plasticized and preferably condrapable polyolefin compositions comprising one or more polyolefins, one or more non-functionalized plasticizers ("NFP"), and one or more functionalized slip agents.

Typically, the polyolefin(s) are present in the compositions of the present invention at from 40 wt % to 99.9 wt % (based upon the weight of the polyolefin and the NFP) in one embodiment, and from 50 wt % to 99 wt % in another embodiment, and from 60 wt % to 98 wt % in yet another embodiment, and from 70 wt % to 97 wt % in yet another embodiment, and from 80 wt % to 97 wt % in yet another embodiment, and from 90 wt % to 98 wt % in yet another embodiment, wherein a desirable range may be any combination of any upper wt % limit with any lower wt % limit described herein.

In another embodiment the plasticized polyolefin comprises polypropylene present at 40 to 99.99 weight %, alternately 50 to 99 weight %, alternately 60 to 99 weight %, alternately 70 to 98 weight %, alternately 80 to 97 weight %, alternately 85 to 99 weight percent, alternately 90 to 96 weight %; the NFP is present at 60 to 0.01 weight %, alternately 50 to 1 weight %, alternately 40 to 1 weight %, alternately 30 to 2 weight %, alternately 20 to 3 weight %, alternately 15 to 1 weight percent, alternately 10 to 4 weight %; and the slip agent is present at 0.001 to 1 weight percent, alternately 0.01 to 0.75 weight percent, alternately 0.05 to 0.5 weight percent, alternately 0.05 to 0.3 weight percent, alternately 0.1 to 0.25 weight percent, based upon the weight of the polypropylene and the NFP. In one embodiment, the composition comprises 1 to 15 weight percent NFP, 85 to 99 weight percent polypropylene, and 0.01 to 0.75 weight percent slip agent, based on the weight of the polypropylene and NFP.

In another embodiment the polyolefin comprises polypropylene, NFP is present at 0.01 to 50 weight %, more preferably 0.05 to 45 weight %, more preferably 0.5 to 40 weight %, more preferably 1 to 35 weight %, more preferably 2 to 30 weight %, more preferably 3 to 25 weight %, more preferably 4 to 20 weight %, more preferably 5 to 15 weight %, and the slip agent is present at 0.001 to 1 weight percent, alternately 0.01 to 0.75 weight percent, alternately 0.05 to 0.5 weight percent, alternately 0.05 to 0.3 weight percent, alternately 0.1 to 0.25 weight percent, based upon the weight of the polypropylene and the NFP. In another embodiment, the NFP is present at 1 to 15 weight %, preferably 1 to 10 weight %, based upon the weight of the polypropylene and the NFP.

In another embodiment the polyolefin comprises polypropylene, the NFP is present at 3 to 10 weight %, and the slip agent at 0.05 to 0.5 weight percent based upon the weight of the polypropylene and the NFP.

For purposes of this invention and the claims thereto the amount of NFP in a given composition is determined by the extraction method or other approach as described below. The CRYSTAF method mentioned below is generally for comparison purposes.

Slip Agent

The polyolefin compositions of the present invention include a slip agent. The slip agent is preferably a fast bloom slip agent, and can be a hydrocarbon having one or more functional groups selected from hydroxide, aryls and substituted aryls, halogens, alkoxys, carboxylates, esters, carbon unsaturation, acrylates, oxygen, nitrogen, carboxyl, sulfate and phosphate.

In one embodiment the slip agent is an ionic compound. Ionic slip agents include salt derivatives of aromatic or aliphatic hydrocarbon oils, notably metal salts of fatty acids, including metal salts of carboxylic, sulfuric, and phosphoric aliphatic saturated or unsaturated acid having a chain length of 7 to 26 carbon atoms, preferably 10 to 22 carbon atoms. Examples of suitable fatty acids include the monocarboxylic acids lauric acid, stearic acid, succinic acid, stearyl lactic acid, lactic acid, phthalic acid, benzoic acid, hydroxystearic acid, ricinoleic acid, naphthenic acid, oleic acid, palmitic acid, erucic acid, and the like, and the corresponding sulfuric and phosphoric acids. Suitable metals include Li, Na, Mg, Ca, Sr, Ba, Zn, Cd, Al, Sn, Pb and so forth. Representative salts include, for example, magnesium stearate, calcium stearate, sodium stearate, zinc stearate, calcium oleate, zinc oleate, magnesium oleate and so on, and the corresponding metal higher alkyl sulfates and metal esters of higher alkyl phosphoric acids.

In another embodiment, the fatty acid metal salts are substantially absent from the polyolefin compositions of the present invention. By "substantially absent," it is meant that these compounds are not added deliberately to the compositions and, if present, are present at less than 1 weight %, more preferably less than 0.8 weight %, more preferably less than 0.5 weight %, more preferably less than 0.1 weight %, more preferably less than 0.05 weight %, more preferably less than 0.01 weight %, more preferably less than 0.001 weight %, based upon the weight of the propylene polymer and the NFP.

In one embodiment the slip agent is a non-ionic functionalized compound. Suitable functionalized compounds include: (a) esters, amides, alcohols and acids of oils including aromatic or aliphatic hydrocarbon oils, for example, mineral oils, naphthenic oils, paraffinic oils; natural oils such as castor, corn, cottonseed, olive, rapeseed, soybean, sunflower, other vegetable and animal oils, and so on.

Representative functionalized derivatives of these oils include, for example, polyol esters of monocarboxylic acids such as glycerol monostearate, pentaerythritol monooleate, and the like, saturated and unsaturated fatty acid amides or ethylenebis(amides), such as oleamide, erucamide, linoleamide, and mixtures thereof, glycols, polyether polyols like Carbowax, and adipic acid, sebacic acid, and the like; (b) waxes, such as carnauba wax, microcrystalline wax, polyolefin waxes, e.g. polyethylene waxes; (c) fluoro-containing polymers such as polytetrafluoroethylene, fluorine oils, fluorine waxes and so forth; and (d) silicon compounds such as silanes and silicone polymers, including silicone oils, polydimethylsiloxane, amino-modified polydimethylsiloxane, and so on.

The fatty amides useful in the present invention are represented by the formula:

where R is a saturated or unsaturated alkyl group having of from 7 to 26 carbon atoms, preferably 10 to 22 carbon atoms, and $R^1$ is independently hydrogen or a saturated or unsaturated alkyl group having from 7 to 26 carbon atoms, preferably 10 to 22 carbon atoms. Compounds according to this structure include for example, palmitamide, stearamide, arachidamide, behenamide, oleamide, erucamide, linoleamide, stearyl stearamide, palmityl palmitamide, stearyl arachidamide and mixtures thereof.

The ethylenebis(amides) useful in the present invention are represented by the formula:

where each R is independently is a saturated or unsaturated alkyl group having of from 7 to 26 carbon atoms, preferably 10 to 22 carbon atoms. Compounds according to this structure include for example, stearamidoethylstearamide, stearamidoethylpalmitamide, palmitamido-ethylstearamide, ethylenebisstearamide, ethylenebisoleamide, stearylerucamide, erucamidoethylerucamide, oleamidoethyloleamide, erucamidoethyloleamide, oleamidoethylerucamide, stearamidoethylerucamide, erucamidoethylpalmitamide, palmitamidoethyloleamide and mixtures thereof.

Commercially available examples of fatty amides include Ampacet 10061 which comprises 5% of a 50:50 mixture of the primary amides of erucic and stearic acids in polyethylene; Elvax 3170 which comprises a similar blend of the amides of erucic and stearic acids in a blend of 18% vinyl acetate resin and 82% polyethylene. These slip agents are available from DuPont. Slip agents also are available from Croda Universal, including Crodamide OR (an oleamide), Crodamide SR (a stearamide), Crodamide ER (an erucamide), and Crodamide BR (a behenamide); and from Crompton, including Kemamide S (a stearamide), Kemamide B (a behenamide), Kemamide 0 (an oleamide), Kemamide E (an erucamide), and Kemamide (an N,N'-ethylenebisstearamide). Other commercially available slip agents include Erucamid ER erucamide.

Generally preferred concentrations of the fatty amide slip agent are in the range of from about 0.001% to about 0.5% by weight of the composition, preferably of from about 0.01% to about 0.4% by weight and most preferably of from about 0.1 parts to about 0.3% by weight based on the weight of the polymer and plasticizer. Generally preferred concentrations of the saturated fatty acid amide or ethylene-bis(amide) are in the range of from about 0.001 parts to about 0.5 parts by weight, preferably from about 0.025 parts to about 0.25 parts by weight, more preferably from about 0.05 parts to about 0.15 parts by weight based on the weight of the polymer and plasticizer. Generally, preferred concentrations of the unsaturated fatty acid amide or ethylene-bis(amide) are in the range of from about 0.001 parts to about 1 part by weight, preferably from about 0.05 parts to about 0.75 parts by weight and most preferably of from about 0.1 parts to about 0.3 parts by weight based on the weight of the polyolefin and NFP.

In another embodiment, functionalized oils other than the amides are substantially absent from the polyolefin compositions of the present invention. Functionalized oils comprise carbon and hydrogen and also include functional groups to more than an appreciable extent, as defined below. By "substantially absent", it is meant that these compounds are not added deliberately to the compositions and, if present, are present at less than 1 weight %, more preferably less than 0.8 weight %, more preferably less than 0.5 weight percent, more preferably less than 0.1 weight percent, more preferably less than 0.05 weight percent, more preferably less than 0.01 weight %, more preferably less than 0.001 weight %, based upon the weight of the propylene polymer and the NFP.

Non-Functionalized Plasticizer

The polyolefin compositions of the present invention include a non-functionalized plasticizer ("NFP"), preferably a liquid NFP. It will be realized that the classes of materials described herein that are useful as NFPs can be utilized alone or admixed with other NFPs and/or slip agents described herein in order to obtain desired properties.

In one embodiment, the NFP of the present invention is a compound comprising carbon and hydrogen, and does not contain an appreciable extent of functional groups selected from hydroxide, aryls and substituted aryls, halogens, alkoxys, carboxylates, esters, acrylates, oxygen, nitrogen, and carboxyl. By "appreciable extent of functional groups", it is meant that these groups and compounds comprising these groups (other than the slip agent) are not deliberately added to the NFP, and if present at all, are present at less than 5 weight % (wt %) in one embodiment, more preferably less than 4 wt %, more preferably less than 3 wt %, more preferably less than 2 wt %, more preferably less than 1 wt %, more preferably less than 0.7 wt %, more preferably less than 0.5 wt %, more preferably less than 0.3 wt %, more preferably less than 0.1 wt %, more preferably less than 0.05 wt %, more preferably less than 0.01 wt %, more preferably less than 0.001 wt %, where wt % is based upon the weight of the NFP and excluding the slip agent.

In another embodiment, the NFP is a hydrocarbon that does not contain olefinic unsaturation to an appreciable extent. By "appreciable extent of olefinic unsaturation" it is meant that the carbons involved in olefinic bonds account for less than 10%, preferably less than 9%, more preferably less than 8%, more preferably less than 7%, more preferably less than 6%, more preferably less than 5%, more preferably less than 4%, more preferably less than 3%, more preferably less than 2%, more preferably less than 1%, more preferably less than 0.7%, more preferably less than 0.5%, more preferably less than 0.3%, more preferably less than 0.1%, more preferably less than 0.05%, more preferably less than 0.01%, more preferably less than 0.001%, of the total number of carbons. In some embodiments, the percent of carbons of the NFP involved in olefinic bonds is between 0.001 and 10% of the total number of carbon atoms in the NFP, preferably between 0.01 and 7%, preferably between 0.1 and 5%, more preferably less than 1%. Percent of carbons involved in olefinic bonds is determined by the method described under Test Methods below.

In one embodiment, the NFP of the present invention comprises $C_{25}$ to $C_{1500}$ paraffins, and $C_{30}$ to $C_{500}$ paraffins in another embodiment. In another embodiment, the NFP consists essentially of $C_{35}$ to $C_{300}$ paraffins, and consists essentially of $C_{40}$ to $C_{250}$ paraffins in another embodiment.

In one embodiment, any NFP described herein has a pour point (ASTM D97) of less than −10° C. in one embodiment, less than −20° C. in another embodiment, less than −25° C. in another embodiment, less than −30° C. in yet another embodiment, less than −35° C. in yet another embodiment, less than −40° C. in yet another embodiment, less than −50° C. in yet another embodiment, and less than −60° C. in yet another embodiment, and greater than −120° C. in yet another embodiment, and greater than −200° C. in yet another embodiment, wherein a desirable range may include any upper pour point limit with any lower pour point limit described herein.

In another embodiment any NFP described herein may have a Viscosity Index (VI) as measured by ASTM D2270 of 90 or more, preferably 95 or more, more preferably 100 or more, more preferably 105 or more, more preferably 110 or more, more preferably 115 or more, more preferably 120 or more, more preferably 125 or more, more preferably 130 or more. In another embodiment the NFP has a VI between 90 and 400, preferably between 120 and 350.

In some embodiments, any NFP described herein may have a Kinematic viscosity at 100° C. (ASTM D445) of at least 2 cSt, from 3 to 3000 cSt in another embodiment, from 6 to 300 cSt in another embodiment, from 6 to 200 cSt in another embodiment, from 8 to 100 cSt in yet another embodiment, from 4 to 50 cSt in yet another embodiment, less than 50 cSt in yet another embodiment, less than 25 cSt in yet another embodiment, and 35 cSt or greater in yet another embodiment, wherein a desirable range may comprise any upper viscosity limit with any lower viscosity limit described herein.

In another embodiment any NFP described herein may have a flash point (ASTM D92) of 200° C. or more, preferably 210° or more, preferably 220° C. or more, preferably 230° C. or more, preferably 240° C. or more, preferably 245° C. or more, preferably 250° C. or more, preferably 260° C. or more, preferably 270° C. or more, preferably 280° C. or more. In another embodiment the NFP has a flash point between 200° C. and 300° C., preferably between 240° C. and 290° C.

In another embodiment, any NFP described herein may have a viscosity index of 120 or more, a flash point greater than 200° C. and (1) a pour point of −25° C. or less or (2) a Kinematic viscosity at 100° C. of 35 cSt or more.

Any NFP described herein may have a dielectric constant measured at 20° C. of less than 3.0 in one embodiment, and less than 2.8 in another embodiment, less than 2.5 in another embodiment, and less than 2.3 in yet another embodiment, and less than 2.1 in yet another embodiment. Polypropylene itself has a dielectric constant (1 kHz, 23° C.) of at least 2.3 according to the CRC HANDBOOK OF CHEMISTRY AND PHYSICS (David R. Lide, ed. 82$^d$ ed. CRC Press 2001).

In some embodiments any NFP described herein may have a specific gravity (ASTM D4052, 15.6/15.6° C.) of less than 0.88 in one embodiment, and less than 0.87 in another embodiment, and less than 0.86 in another embodiment, and less than 0.85 in another embodiment, and from 0.80 to 0.87 in another embodiment, and from 0.81 to 0.86 in another embodiment, and from 0.82 to 0.85 in another embodiment, wherein a desirable range may comprise any upper specific gravity limit with any lower specific gravity limit described herein.

In a preferred embodiment, any NFP described herein has a specific gravity (15.6/15.6° C.) of 0.85 or less (preferably between 0.80 and 0.85) and a Kinematic viscosity at 100° C. of 3 cSt or more (preferably 4 or more, preferably 5 cSt or more, preferably 8 cSt or more, preferably 10 cSt or more, preferably 15 cSt or more, preferably 20 cSt or more) and/or a carbon number of at least 20.

In another preferred embodiment, any NFP described herein has a specific gravity (15.6/15.6° C.) of 0.86 or less (preferably between 0.81 and 0.86, preferably between 0.82 and 0.855) and a Kinematic viscosity at 100° C. of 5 cSt or more (preferably 6 or more, preferably 8 cSt or more, preferably 10 cSt or more, preferably 12 cSt or more, preferably 15 cSt or more, preferably 20 cSt or more preferably 35 cSt or more) and/or a carbon number of at least 30.

In another preferred embodiment, the NFP has a specific gravity (15.6/15.6° C.) of 0.87 or less (preferably between 0.82 and 0.87) and a Kinematic viscosity at 100° C. of 10 cSt or more (preferably 12 cSt or more, preferably 14 cSt or more, preferably 16 cSt or more, preferably 20 cSt or more, preferably 30 cSt or more, preferably 35 cSt or more, preferably 40 cSt or more) and/or a carbon number of at least 50.

In yet another preferred embodiment, the NFP has a specific gravity (15.6/15.6° C.) of 0.88 or less (preferably 0.87 or less, preferably between 0.82 and 0.87) and a Kinematic viscosity at 100° C. of 15 cSt or more (preferably 20 cSt or more, preferably 25 cSt or more, preferably 30 cSt or more, preferably 40 cSt or more) and/or a carbon number of at least 60.

In other embodiments any NFP described herein may have an initial boiling point (ASTM D1160) of from 300° C. to 600° C. in one embodiment, and from 350° C. to 500° C. in another embodiment, and greater than 400° C. in yet another embodiment.

In other embodiments any NFP described herein may have a low degree of color, such as typically identified as "water white", "prime white", "standard white", or "bright and clear," preferably an APHA color of 100 or less, preferably 80 or less, preferably 60 or less, preferably 40 or less, preferably 20 or less, as determined by ASTM D1209.

The NFP preferably has a number average molecular weight ($M_n$) of 21,000 g/mole or less in one embodiment, preferably 20,000 g/mole or less, preferably 19,000 g/mole or less, preferably 18,000 g/mole or less, preferably 16,000 g/mole or less, preferably 15,000 g/mole or less, preferably 13,000 g/mole or less and 10,000 g/mole or less in yet another embodiment, and 5,000 g/mole or less in yet another embodiment, and 3,000 g/mole or less in yet another embodiment, and 2,000 g/mole or less in yet another embodiment, and 1500 g/mole or less in yet another embodiment, and 1,000 g/mole or less in yet another embodiment, and 900 g/mole or less in yet another embodiment, and 800 g/mole or less in yet another embodiment, and 700 g/mole or less in yet another embodiment, and 600 g/mole or less in yet another embodiment, and 500 g/mole or less in yet another embodiment. Preferred minimum $M_n$ is at least 200 g/mole, preferably at least 300 g/mole. Further a desirable molecular weight range can be any combination of any upper molecular weight limit with any lower molecular weight limit described above. $M_n$ is determined according to the methods specified under Fluid Properties in the Test Methods section below.

In a preferred embodiment of the present invention, addition of the NFP lowers the flexural modulus of the polypropylene composition without substantially lowering the melting point; specifically, the flexural modulus (measured by ASTM D790A) is reduced by 10% or more while the melting point (measured by DSC) is lowered by 1° C. or less for every 10 weight % of NFP added, preferably 15% or more, preferably 20% or more, as compared to the same composition without the NFP present.

In another embodiment the polypropylene/NFP/slip agent compositions described herein have at −40° C. a 0.05 (or greater) increase in the Tan Delta for every 10 weight % of NFP added to the composition, as compared to the same composition without the NFP present, preferably a 0.10 increase or greater.

Any of the NFPs may also be described by any number of, or any combination of, parameters described herein.

In a preferred embodiment the NFPs described herein have a Kinematic viscosity at 100° C. of 3 to 3000 cSt, preferably 6 to 300 cSt, more preferably 8 to 100 cSt; and/or a number average molecular weight ($M_n$) of 300 to 21,000 g/mole, preferably 500 to 5,000 g/mole, more preferably 600 to 3,000 g/mole; and/or a carbon number of 20 to 1500, preferably 35 to 400, more preferably 40 to 250.

In another preferred embodiment the NFPs described herein have a Kinematic viscosity at 100° C. of 3 to 500 cSt, preferably 6 to 200 cSt, more preferably 8 to 100 cSt, more preferably 3 to 25 cSt; and/or a number average molecular weight ($M_n$) of 300 to 10,000 g/mole, preferably 400 to 5,000 g/mole, more preferably 500 to 2,500 g/mole, more preferably 300 to 1,200 g/mole; and/or a carbon number of 25 to 500, preferably 30 to 400, more preferably 40 to 200, more preferably 20 to 100.

In another preferred embodiment the NFPs described herein have a Kinematic viscosity at 100° C. of 3 to 100 cSt, preferably 4 to 50 cSt, more preferably 6 to 25 cSt, more preferably 3 to 15 cSt; and/or a number average molecular weight ($M_n$) of 300 to 3,000 g/mole, preferably 350 to 2,000 g/mole, more preferably 400 to 1,000 g/mole, more preferably 300 to 800 g/mole; and/or a carbon number of 20 to 200, preferably 25 to 150, more preferably 30 to 100, more preferably 20 to 70.

In a preferred embodiment, the NFP has a pour point of −25° C. or less, preferably between −30° C. and −90° C., and a Kinematic viscosity in the range of from 20 to 5000 cSt at 40° C. In another preferred embodiment, the NFP has a pour point of −25° C. or less and a number-average molecular weight of 400 g/mole or greater. Most mineral oils, which typically include functional groups, have a pour point of from 10° C. to −25° C. at the same viscosity and molecular weight ranges.

In another preferred embodiment the NFP has Kinematic viscosity at 100° C. of 3 cSt or greater, preferably 6 cSt or greater, more preferably 8 cSt or greater, and one or more of the following properties:

1. a pour point of −10° C. or less, preferably −20° C. or less, preferably −25° C. or less, preferably −30° C. or less, preferably −40° C. or less; and/or,
2. a Viscosity Index of 120 or greater; and/or,
3. a low degree of color, such as typically identified as "water white", "prime white", "standard white", or "bright and clear," preferably an APHA color of 100 or less, preferably 80 or less, preferably 60 or less, preferably 40 or less, preferably 20 or less, preferably 15 or less as determined by ASTM D1209; and/or
4. a flash point of 200° C. or more, preferably 220° C. or more, preferably 240° C. or more; and/or
5. a specific gravity (15.6° C.) of less than 0.86.

Most mineral oils at the same viscosity range have a pour point greater than −20° C. or an APHA color of greater than 20 or a specific gravity (15.6° C.) of 0.86 or more.

In another preferred embodiment, the NFP has a Viscosity Index of 120 or more and one or more of the following properties:

1. a pour point of −10° C. or less, preferably −20° C. or less, preferably −25° C. or less, preferably −30° C. or less, preferably −40° C. or less; and/or,
2. a Kinematic viscosity at 100° C. of 3 cSt or greater, preferably 6 cSt or greater, preferably 8 cSt or greater, preferably 10 cSt or greater, preferably 35 cSt or greater; and/or,
3. a low degree of color, such as typically identified as "water white", "prime white", "standard white", or "bright and clear," preferably an APHA color of 100 or less, preferably 80 or less, preferably 60 or less, preferably 40 or less, preferably 20 or less, preferably 15 or less, as determined by ASTM D1209; and/or
4. a flash point of 200° C. or more, preferably 220° C. or more, preferably 240° C. or more; and/or
5. a specific gravity (15.6° C.) of less than 0.86.

Most mineral oils have a Viscosity Index of less than 120.

In another preferred embodiment, the NFP has a pour point of −20° C. or less, preferably −25° C. or less, preferably −30° C. or less, and one or more of the following properties:

1. a Kinematic viscosity at 100° C. of 3 cSt or greater, preferably 6 cSt or greater, preferably 8 cSt or greater, preferably 10 cSt or more, preferably 35 cSt or greater; and/or,
2. a Viscosity Index of 120 or greater, preferably 130 or greater; and/or,
3. a low degree of color, such as typically identified as "water white", "prime white", "standard white", or "bright and clear," preferably APHA color of 100 or less, preferably 80 or less, preferably 60 or less, preferably 40 or less, preferably 20 or less, preferably 15 or less as determined by ASTM D1209
4. a flash point of 200° C. or more, preferably 220° C. or more, preferably 240° C. or more; and/or
5. a specific gravity (15.6° C.) of less than 0.86.

Most mineral oils have a Kinematic viscosity at 100° C. of less than 6 cSt, or an APHA color of greater than 20, or a flash point less than 200° C. when their pour point is less than −20° C.

Characteristics of some commercially available mineral oils marketed as process oils in polymers are listed in Table 1a below.

TABLE 1a

Commercial Examples of Mineral Oils

| Grade | KV @ 100° C., cSt | VI | Pour Point, ° C. | Specific gravity | Flash Point, ° C. | APHA Color |
|---|---|---|---|---|---|---|
| Drakeol 34 [1] | 9 | 99 | −12 | 0.872 | 254 | 10 |
| Paralux 1001R [2] | 4 | 99 | −17 | 0.849 | 212 | 25 |
| Paralux 2401R [2] | 6 | 101 | −12 | 0.863 | 234 | 45 |
| Paralux 6001R [2] | 12 | 102 | −21 | 0.871 | 274 | 45 |
| Sunpar 120 [3] | 6 | 106 | −15 | 0.872 | 228 | >200 |
| Sunpar 150 [3] | 11 | 97 | −9 | 0.881 | 245 | >300 |
| Sunpar 2280 [3] | 31 | 95 | −9 | 0.899 | 305 | >300 |
| Plastol 135 [4] | 5 | 104 | −9 | 0.865 | 210 | 10 |
| Plastol 537 [4] | 11 | 97 | −3 | 0.880 | 240 | 10 |
| Plastol 2105 [4] | 30 | 110 | −15 | 0.885 | 270 | 10 |
| Flexon 843 [4] | 5 | 91 | −12 | 0.869 | 218 | >250 |
| Flexon 865 [4] | 11 | 93 | −3 | 0.879 | 252 | >250 |
| Flexon 815 [4] | 32 | 101 | −9 | 0.895 | 310 | >300 |
| Shellflex 210 [5] | 4 | 95 | −18 | 0.860 | 216 | >200 |
| Shellflex 330 [5] | 9 | 95 | −10 | 0.875 | 256 | >250 |
| Shellflex 810 [5] | 33 | 95 | −9 | 0.896 | 324 | >300 |

[1] Available commercially from Penreco.
[2] Available commercially from ChevronTexaco.
[3] Available commercially from Sunoco.
[4] Available commercially from ExxonMobil.
[5] Available commercially from Shell.

In another preferred embodiment the NFP has a glass transition temperature ($T_g$) that cannot be determined by ASTM E1356 or, if it can be determined, then the $T_g$ according to ASTM E1356 is less than 0° C., preferably less than −10° C., more preferably less than −20° C., more preferably less than −30° C., more preferably less than −40° C., and, preferably, also has one or more of the following properties:

1. an initial boiling point as determined by ASTM D1160 greater than 300° C., preferably greater than 350° C., preferably greater than 400° C.; and/or
2. a pour point of −10° C. or less, preferably −15° C. or less, preferably −25° C. or less, preferably −35° C. or less, preferably −45° C. or less; and/or
3. a specific gravity (ASTM D4052, 15.6/15.6° C.) of less than 0.88, preferably less than 0.86, preferably less than 0.84, preferably from 0.80 to 0.88, preferably from 0.82 to 0.86; and/or
4. a final boiling point as determined by ASTM D1160 of from 300° C. to 800° C., preferably from 400° C. to 700° C., preferably greater than 500° C.; and/or
5. a weight average molecular weight ($M_w$) between 30,000 and 400 g/mole preferably between 15,000 and 500 g/mole, more preferably between 5,000 and 600 g/mole; and/or
6. a number average molecular weight ($M_n$) between 10,000 and 400 g/mole, preferably between 5,000 and 500 g/mole, more preferably between 2,000 and 600 g/mole; and/or
7. a flash point as measured by ASTM D92 of 200° C. or greater, and/or
8. a dielectric constant at 20° C. of less than 3.0, preferably less than 2.8, preferably less than 2.5, preferably less than 2.3, preferably less than 2.2; and/or
9. a carbon number of from 25 to 800, preferably 30 to 500, preferably 35 to 300.

Molecular weight and carbon number are determined using the methods described in the Test Methods section below.

This invention also relates to polyolefin compositions comprising one or more propylene polymers, one or more slip agents and one or more NFPs where the NFP comprises a polyalphaolefin (PAO) comprising oligomers or polymers of $C_5$ to $C_{14}$ olefins having a Kinematic viscosity at 100° C. of 3 cSt or more, preferably 6 cSt or more, preferably of 8 cSt or more, and a Viscosity Index of 120 or more, preferably 130 or more. Preferably a combination of modifiers is used were the combination has a Kinematic viscosity at 100° C. of 3 cSt or more, preferably 6 cSt or more, preferably of 8 cSt or more, and a Viscosity Index of 120 or more, preferably 130 or more.

This invention also relates to polyolefin compositions comprising one or more propylene copolymers, one or more slip agents and one or more NFPs where the NFP comprises oligomers or polymers of $C_6$ to $C_{14}$ olefins having a Viscosity Index of 120 or more, provided that when the polypropylene composition comprises between 4 and 10 weight % of polyalphaolefin that is a hydrogenated, highly branched dimer of an alpha olefin having 8-12 carbon atoms, the composition does not comprise between 18 and 25 weight percent of a linear low density polyethylene having a density of 0.912 to 0.935 g/cm$^3$.

In another embodiment the NFP comprises polyalphaolefins (PAO's) comprising oligomers or polymers of linear olefins having 6 to 14 carbon atoms, more preferably 8 to 12 carbon atoms, more preferably 10 carbon atoms, where an individual NFP or a combination of NFPs has a Kinematic viscosity at 100° C. of 3 cSt or more, preferably 6 cSt or more, preferably 8 cSt or more (as measured by ASTM D445); and preferably having a Viscosity Index of 100 or more, preferably 110 or more, more preferably 120 or more, more preferably 130 or more, more preferably 140 or more (as determined by ASTM D2270); and having a pour point of −10° C. or less, more preferably −20° C. or less, more preferably −30° C. or less (as determined by ASTM D97).

In another embodiment polyalphaolefin (PAO) oligomers or polymers useful in the present invention comprise $C_{20}$ to $C_{1500}$ paraffins, preferably $C_{35}$ to $C_{400}$ paraffins, preferably $C_{40}$ to $C_{250}$ paraffins. The PAO oligomers/polymers are dimers, trimers, tetramers, pentamers, etc. of $C_5$ to $C_{14}$ α-olefins in one embodiment, and $C_6$ to $C_{14}$ α-olefins in another embodiment, and $C_8$ to $C_{12}$ α-olefins in another embodiment, and $C_{10}$ α-olefins in another embodiment. Suitable olefins include 1-pentene, 1-hexene, 1-heptene, 1-octene, 1-nonene, 1-decene, 1-undecene and 1-dodecene. In one embodiment, the olefin is 1-decene, and the NFP is a mixture of dimers, trimers, tetramers and pentamers (and higher) of 1-decene. In another embodiment, the PAO is comprised of oligomers or polymers of 1-octene, 1-decene, and 1-dodecene. Preferred PAO's are described more particularly in, for example, U.S. Pat. No. 5,171,908, and U.S. Pat. No. 5,783,531 and in SYNTHETIC LUBRICANTS AND HIGH-PERFORMANCE FUNCTIONAL FLUIDS 1-52 (Leslie R. Rudnick & Ronald L. Shubkin, ed. Marcel Dekker, Inc. 1999). The PAO oligomers or polymers useful in the present invention may be characterized by any degree of tacticity, including isotacticity or syndiotacticity, and may be atactic. In another embodiment the polyalphaolefin has more than 50% meso dyads as measured by $^{13}$Carbon NMR, preferably more than 60%. In another embodiment the polyalphaolefin has more than 50% racemic dyads as measured by $^{13}$Carbon NMR, preferably more than 60%.

PAO's useful in the present invention typically possess a number average molecular weight of from 300 to 21,000 g/mole in one embodiment, from 400 to 20,000 g/mole in another embodiment, from 500 to 10,000 g/mole in another embodiment, from 500 to 5,000 g/mole in another embodiment, from 600 to 3,000 g/mole in another embodiment, and from 500 to 1,500 g/mole in yet another embodiment. Preferred PAO's have Kinematic viscosities at 100° C. in the range of 3 to 3000 cSt in one embodiment, from 4 to 3000 cSt in another embodiment, from 6 to 300 cSt in another embodiment, and from 8 to 100 cSt in another embodiment. PAO's useful in the present invention typically have pour points of less than −10° C. in one embodiment, and less than −20° C. in another embodiment, and less than −30° C. in yet another embodiment. Preferred PAO's may also have a carbon number of 20 to 1500, preferably 25 to 1500, preferably 35 to 400, preferably 40 to 250. Desirable PAO's are commercially available as SpectraSyn and SpectraSyn Ultra (ExxonMobil Chemical Company, Houston Tex., previously sold under the SHF and SuperSyn tradenames), some of which are summarized in the Table 1b below.

TABLE 1b

SpectraSyn Series Polyalphaolefins

| PAO | KV @ 100° C., cSt | VI | Pour Point, ° C. | Specific gravity | Flash Point, ° C. | APHA Color |
|---|---|---|---|---|---|---|
| SpectraSyn 4 | 4 | 126 | −66 | 0.820 | 220 | 10 |
| SpectraSyn 6 | 6 | 138 | −57 | 0.827 | 246 | 10 |
| SpectraSyn 8 | 8 | 139 | −48 | 0.833 | 260 | 10 |
| SpectraSyn 10 | 10 | 137 | −48 | 0.835 | 266 | 10 |
| SpectraSyn 40 | 39 | 147 | −36 | 0.850 | 281 | 10 |
| SpectraSyn 100 | 100 | 170 | −30 | 0.853 | 283 | 60 |
| SpectraSyn Ultra 150 | 150 | 218 | −33 | 0.850 | >265 | 10 |
| SpectraSyn Ultra 300 | 300 | 241 | −27 | 0.852 | >265 | 20 |
| SpectraSyn Ultra 1000 | 1,000 | 307 | −18 | 0.855 | >265 | 30 |

Other useful PAO's include those sold under the tradenames Synfluid™ available from ChevronPhillips Chemical Company (Pasadena, Tex.), Durasyn™ available from BP Amoco Chemicals (London, England), Nexbase™ available from Fortum Corporation (Keilaniemi, Finland), and Synton™ available from Crompton Corporation (Middlebury, Conn.).

In other embodiments the PAO's have a Kinematic viscosity at 100° C. of 3 cSt or more, preferably 6 cSt or more, preferably 8 cSt or more, preferably 10 cSt or more, preferably 20 cSt or more, preferably 300 cSt or less, preferably 100 cSt or less. In another embodiment the PAO's have a Kinematic viscosity at 100° C. of between 3 and 1000 cSt, preferably between 6 and 300 cSt, preferably between 8 and 100 cSt, preferably between 8 and 40 cSt.

In other embodiments the PAO's have a Viscosity Index of 120 or more, preferably 130 or more, preferably 140 or more, preferably 150 or more, preferably 170 or more, preferably 200 or more, preferably 250 or more.

In other embodiments the PAO's have a pour point of −10° C. or less, preferably −20° C. or less, preferably −30° C. or less (as determined by ASTM D97).

In other embodiments the PAO's have a flash point of 200° C. or more, preferably 220° C. or more, preferably 240° C. or more, preferably between 260° C. and 290° C.

In another embodiment, the NFP is a high purity hydrocarbon fluid with a branched paraffin:normal paraffin ratio ranging from about 0.5:1 to 9:1, preferably from about 1:1 to 4:1. The branched paraffins of the mixture contain greater than 50 wt % (based on the total weight of the branched paraffins) mono-methyl species, for example, 2-methyl, 3-methyl, 4-methyl, 5-methyl or the like, with minimum formation of branches with substituent groups of carbon number greater than 1, such as, for example, ethyl, propyl, butyl or the like; preferably, greater than 70 wt % of the branched paraffins are mono-methyl species. The paraffin mixture has a number-average carbon number ($C_n$) in the range of 20 to 500, preferably 30 to 400, preferably 40 to 200, preferably 25 to 150, preferably 30 to 100, more preferably 20 to 100, more preferably 20 to 70; has a Kinematic viscosity at 100° C. ranging from 3 to 500 cSt, preferably 6 to 200 cSt, preferably 8 to 100 cSt, more preferably 6 to 25 cSt, more preferably 3 to 25 cSt, more preferably 3 to 15 cSt; and boils within a range of from 100 to 350° C., preferably within a range of from 110 to 320° C., preferably within a range of 150 to 300° C. In a preferred embodiment, the paraffinic mixture is derived from a Fischer-Tropsch process. These branch paraffin/n-paraffin blends are described in, for example, U.S. Pat. No. 5,906,727.

In another embodiment, the NFP comprises paraffinic hydrocarbons having:

1. a number average molecular weight of 300 to 10,000 g/mol, preferably 400 to 5,000 g/mol, preferably 500 to 2,500 g/mol, preferably 300 to 1,200 g/mol;
2. less than 10% of sidechains with 4 or more carbons, preferably less than 8%, preferably less than 5%, preferably less than 3%, preferably less than 2%, preferably less than 1%, preferably less than 0.5%, preferably less than 0.1%;
3. at least 15% of sidechains with 1 or 2 carbons, preferably 20% or more, preferably 25% or more, preferably 30% or more, preferably 35% or more, preferably 40% or more, preferably 45% or more, preferably 50% or more;
4. less than 2.5 wt % cyclic paraffins (based on the total weight of paraffins in the mixture), preferably less than 2 wt %, preferably less than 1 wt %, preferably less than 0.5 wt %, preferably less than 0.1 wt %, preferably at less than 0.1 wt %, preferably at 0.001 wt %;
5. a Kinematic viscosity at 100° C. of 3 cSt or more, preferably 6 cSt or more, preferably 8 cSt or more, preferably between 3 and 25 cSt; and
6. a viscosity index (VI) of 110 or more, preferably 120 or more, preferably 130 or more, preferably 140 or more, preferably 150 or more, preferably 180 or more, preferably 200 or more, preferably 250 or more, preferably 300 or more; and
7. a pour point of −10° C. or less; and
8. a flash point of 200° C. or more.

In another embodiment, the NFP comprises a wax isomerate lubricant oil basestock, which includes hydroisomerized waxy stocks (e.g. waxy stocks such as gas oils, slack waxes, fuels hydrocracker bottoms, etc.), hydroisomerized Fischer-Tropsch hydrocarbons and waxes, Gas-to-Liquids (GTL) base stocks and base oils, and other waxy feedstock derived hydroisomerized base stocks and base oils, or mixtures thereof. Fischer-Tropsch waxes, the high boiling point residues of Fischer-Tropsch synthesis, are highly paraffinic hydrocarbons with very low sulfur content, and are often preferred feedstocks in processes to make hydrocarbon fluids of lubricating viscosity.

The hydroprocessing used for the production of such base stocks may use an amorphous hydrocracking/hydroisomerization catalyst, such as one of the specialized lube hydrocracking catalysts or a crystalline hydrocracking/hydroisomerization catalyst, preferably a zeolitic catalyst. For example, one useful catalyst is ZSM-48 as described in U.S. Pat. No. 5,075,269. Processes for making hydrocracked/hydroisomerized distillates and hydrocracked/hydroisomerized waxes are described, for example, in U.S. Pat. Nos. 2,817,693; 4,975,177; 4,921,594 and 4,897,178 as well as in British Patent Nos. 1,429,494; 1,350,257; 1,440,230 and 1,390,359. Particularly favorable processes are described in European Patent Application Nos. 464546 and 464547. Processes using Fischer-Tropsch wax feeds are described in U.S. Pat. Nos. 4,594,172 and 4,943,672.

Gas-to-Liquids (GTL) base stocks and base oils, Fischer-Tropsch hydrocarbon derived base stocks and base oils, and other waxy feedstock derived base stocks and base oils (or wax isomerates) that can be advantageously used in the present invention have a Kinematic viscosities at 100° C. of about 3 cSt to about 500 cSt, preferably about 6 cSt to about 200 cSt, preferably about 8 cSt to about 100 cSt, more preferably about 3 cSt to about 25 cSt. These Gas-to-Liquids (GTL) base stocks and base oils, Fischer-Tropsch hydrocarbon derived base stocks and base oils, and other waxy feedstock derived base stocks and base oils (or wax isomerates) have pour points (preferably less than −10° C., preferably about −15° C. or lower, preferably about −25° C. or lower, preferably −30° C. to about −40° C. or lower); have a high viscosity index (preferably 110 or greater, preferably 120 or greater, preferably 130 or greater, preferably 150 or greater); and are typically of high purity (high saturates levels, low-to-nil sulfur content, low-to-nil nitrogen content, low-to-nil aromatics content, low bromine number, low iodine number, and high aniline point). Useful compositions of Gas-to-Liquids (GTL) base stocks and base oils, Fischer-Tropsch hydrocarbon derived base stocks and base oils, and wax isomerate hydroisomerized base stocks and base oils are recited in U.S. Pat. Nos. 6,080,301; 6,090,989, and 6,165,949 for example, and are incorporated herein in their entirety by reference.

In a preferred embodiment the NFP (s) of the present invention comprises a GTL-derived base-stock or base-oil that has a Kinematic viscosity at 100° C. of 3 to 500 cSt, preferably 6 to 200 cSt, preferably 8 to 100 cSt, more preferably 3 to 25 cSt; and/or a number average molecular weight ($M_n$) of 300 to 10,000 g/mole, preferably 400 to 5,000 g/mole, preferably 500 to 2,500 g/mole, more preferably 300 to 1,200 g/mole; and/or a carbon number of 20 to 500, preferably 30 to 400, preferably 40 to 200, more preferably 20 to 100.

In another embodiment the NFP comprises a Group III hydrocarbon basestock. Preferably the NFP comprises a severely hydrotreated mineral oil having a saturates levels of 90% or more, preferably 92% or more, preferably 94% or more, preferably 95% or more, and sulfur contents less than 0.03%, preferably between 0.001 and 0.01%, and VI is in excess of 120, preferably 130 or more. Preferably the Group III hydrocarbon base stock has a Kinematic viscosity at 100° C. of 3 to 100, preferably 4 to 100 cSt, preferably 6 to 50 cSt, preferably 8 to 20; and/or a number average molecular weight of 300 to 5,000, preferably 400 to 2,000, more preferably 500 to 1,000; and/or a carbon number of 20 to 400, preferably 25 to 400, preferably 35 to 150, more preferably 40 to 100. Preferably the Group III hydrocarbon basestock has a pour point of −10° C. or less, and a flash point of 200° C. or more. Preferably, the NFP has VI of 120 or more, a flash point greater than 200° C. and (1) a pour point of −25° C. or less or (2) a Kinematic viscosity at 100° C. of 35 cSt or more.

Preferably, the NFP is not an oligomer or polymer of $C_4$ olefin(s) (including all isomers, e.g. n-butene, 2-butene, isobutylene, and butadiene, and mixtures thereof). Such materials, which are referred to as "polybutene" liquids (or "polybutenes") when the oligomers comprise isobutylene and/or 1-butene and/or 2-butene, are commonly used as additives for polyolefins; e.g. to introduce tack or as a processing aid. The ratio of $C_4$ olefin isomers can vary by manufacturer and by grade, and the material may or may not be hydrogenated after synthesis. Commercial sources of polybutenes include BP (Indopol grades) and Infineum (C-Series grades). When the $C_4$ olefin is exclusively isobutylene, the material is referred to as "polyisobutylene" or PIB. Commercial sources of PIB include Texas Petrochemical (TPC Enhanced PIB grades). When the $C_4$ olefin is exclusively 1-butene, the material is referred to as "poly-n-butene" or PNB. Properties of some liquids made from $C_4$ olefin(s) are summarized in Table 1c below. Note that grades with a flash point of 200° C. or more also have a pour point greater than −10° C. and/or a VI less than 120.

TABLE 1c

Commercial Examples of Oligomers of $C_4$ olefin(s)

| Grade | KV @ 100° C., cSt | VI | Pour Point, ° C. | Specific gravity | Flash Point, ° C. |
|---|---|---|---|---|---|
| TPC 137 (PIB) | 6 | 132 | −51 | 0.843 | 120 |
| TPC 1105 (PIB) | 220 | 145 | −6 | 0.893 | 200 |
| TPC 1160 (PIB) | 660 | 190 | 3 | 0.903 | 230 |
| BP Indopol H-25 | 52 | 87 | −23 | 0.869 | ~150 |
| BP Indopol H-50 | 108 | 90 | −13 | 0.884 | ~190 |
| BP Indopol H-100 | 218 | 121 | −7 | 0.893 | ~210 |
| Infineum C9945 | 11 | 74* | −34 | 0.854 | 170 |
| Infineum C9907 | 78 | 103* | −15 | 0.878 | 204 |
| Infineum C9995 | 230 | 131* | −7 | 0.888 | 212 |
| Infineum C9913 | 630 | 174* | 10 | 0.888 | 240 |

*Estimated based on the Kinematic viscosity at 100° C. and 38° C.

Preferably, the NFP is not an oligomer or polymer of C4 olefin(s); however, when a NFP is present, an oligomer or polymer of $C_4$ olefin(s) (including all isomers, e.g. n-butene, 2-butene, isobutylene, and butadiene, and mixtures thereof) may be present in the composition. In a preferred embodiment, the composition comprises less than 50 wt % (preferably less than 40%, preferably less than 30 wt %, preferably less than 20 wt %, more preferably less than 10 wt %, more preferably less than 5 wt %, more preferably less than 1 wt %, preferably 0 wt %) polymer or oligomer of $C_4$ olefin(s) such as PIB, polybutene, or PNB, based upon the weight of the composition.

In a preferred embodiment, the NFP contains less than 50 weight % of $C_4$ olefin(s), preferably isobutylene, based upon the weight of the NFP. Preferably the NFP contains less than 45 weight %, preferably less than 40 wt %, preferably less than 35 wt %, preferably less than 30 wt %, preferably less than 25 wt %, preferably less than 20 wt %, preferably less than 15 wt %, preferably less than 10 wt %, preferably 5 wt %, preferably less than 4 wt %, preferably less than 3%, preferably less than 2%, preferably less than 1 wt %, preferably less than 0.5 wt %, preferably less than 0.25 wt % of $C_4$ olefin(s), preferably isobutylene, based upon the weight of the NFP.

In a preferred embodiment, the composition comprises less than 50 wt % (preferably less than 40 wt %, preferably less than 30 wt %, preferably less than 20 wt %, preferably less than 15 wt %, preferably less than 10 wt %, preferably less than 5 wt %, preferably less than 1 wt %, preferably 0%) of ethylene/alpha-olefin co-oligomer or copolymer where the alpha-olefin(s) are chosen from propylene, 1-butene, 1-hexene, and/or 1-octene and the ethylene/alpha-olefin co-oligomer/copolymer is a liquid, based upon the weight of the composition.

In a preferred embodiment, the compositions of this invention comprise less than 10 weight % of an EP Rubber, based upon the weight of the composition, preferably less than 5 weight %, preferably less than 1 weight %, preferably less than 0.1 weight %. For purposes of this invention and the claims thereto, an EP Rubber is defined to be a copolymer of ethylene and propylene, and optionally diene monomer(s), where the ethylene content is from 35 to 80 weight %, the diene content is 0 to 15 weight %, and the balance is propylene; and where the copolymer has a Mooney viscosity, ML(1+4) @ 125° C. (measured according to ASTM D1646) of 15 to 100.

In a preferred embodiment, the compositions of this invention comprise less than 10 weight % of an elastomer, based upon the weight of the composition, preferably less than 5 weight %, preferably less than 1 weight %, preferably less than 0.1 weight %. By "elastomers" is meant all natural and synthetic rubbers, including those defined in ASTM D1566. Examples of elastomers include, but are not limited to, ethylene propylene rubber, ethylene propylene diene monomer rubber, styrenic block copolymer rubbers (including SEBS, SI, SIS, SB, SBS, SIBS and the like, where S=styrene, EB=random ethylene+butene, I=isoprene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans).

Preferred NFP's of this invention are characterized in that, when blended with the polyolefin to form a plasticized composition, the NFP is miscible with the polyolefin as indicated by no change in the number of peaks in the Dynamic Mechanical Thermal Analysis (DMTA) trace as in the unplasticized polyolefin DMTA trace. Lack of miscibility is indicated by an increase in the number of peaks in DMTA trace over those in the unplasticized polyolefin. The trace is the plot of tan-delta versus temperature, as described below.

Preferred compositions of the present invention can be characterized in that the glass transition temperature ($T_g$) of the composition decreases by at least 2° C. for every 4 wt % of NFP present in the composition in one embodiment; and decreases by at least 3° C. for every 4 wt % of NFP present in the composition in another embodiment; and decreases from at least 4 to 10° C. for every 4 wt % of NFP present in the composition in yet another embodiment, while the peak melting and crystallization temperatures of the polyolefin remain constant (within 1 to 2° C.). For purpose of this invention and the claims thereto when glass transition temperature is referred to it is the peak temperature in the DMTA trace.

Preferred compositions of the present invention can be characterized in that the glass transition temperature ($T_g$) of the composition decreases by at least 2° C. for every 1 wt % of NFP present in the composition in one embodiment; preferably by at least 3° C., preferably by at least 4° C., preferably by at least 5° C., preferably by at least 6° C., preferably by at least 7° C., preferably by at least 8° C., preferably by at least 9° C., preferably by at least 10° C., preferably by at least 11° C.; preferably while the peak melting and or crystallization temperatures of the neat polyolefin remain within 1 to 5° C. of the plasticized polyolefin, preferably within 1 to 4° C., preferably within 1 to 3° C., preferably within 1 to 2° C.

Preferred compositions of the present invention can be characterized in that the glass transition temperature ($T_g$) of the plasticized composition is at least 2° C. lower than that of the neat polyolefin, preferably at least 4° C. lower, preferably at least 6° C. lower, preferably at least 8° C. lower, preferably at least 10° C. lower, preferably at least 15° C. lower, preferably at least 20° C. lower, preferably at least 25° C. lower, preferably at least 30° C. lower, preferably at least 35° C. lower, preferably at least 40° C. lower, preferably at least 45° C. lower.

Preferred compositions of the present invention can be characterized in that the plasticized composition decreases less than 3%, preferably less than 2%, preferably less than 1% in weight when stored at 70° C. for 311 hours in a dry oven as determined by ASTM D1203 using a 0.25 mm thick sheet.

Polypropylene

The NFP's described herein are blended with at least one propylene polymer to prepare the plasticized compositions of this invention.

In one aspect of the invention, the polypropylene is selected from polypropylene homopolymer, polypropylene copolymers, and blends thereof. The homopolymer may be atactic polypropylene, isotactic polypropylene, syndiotactic polypropylene and blends thereof. The copolymer can be a random copolymer, a statistical copolymer, a block copolymer, and blends thereof. In particular, the inventive polymer blends described herein include impact copolymers, elastomers and plastomers, any of which may be physical blends or in situ blends with the polypropylene. The method of making the polypropylene is not critical, as it can be made by slurry, solution, gas phase or other suitable processes, and by using catalyst systems appropriate for the polymerization of polyolefins, such as Ziegler-Natta-type catalysts, metallocene-type catalysts, other appropriate catalyst systems or combinations thereof. In a preferred embodiment the propylene polymers are made by the catalysts, activators and processes described in U.S. Pat. No. 6,342,566, U.S. Pat. No. 6,384,142, WO 03/040201, WO 97/19991 and U.S. Pat. No. 5,741,563. Likewise the impact copolymers may be prepared by the process described in U.S. Pat. No. 6,342,566, U.S. Pat. No. 6,384,142. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al., *Selectivity in Propene Polymerization with Metallocene Catalysts*, 100 CHEM. REV. 1253-1345 (2000); and I, II METALLOCENE-BASED POLYOLEFINS (Wiley & Sons 2000).

Preferred propylene homopolymers and copolymers useful in this invention typically have:

1. an Mw of 30,000 to 2,000,000 g/mol preferably 50,000 to 1,000,000, more preferably 90,000 to 500,000, as measured by GPC as described below in the test methods; and/or
2. an Mw/Mn of 1 to 40, preferably 1.6 to 20, more preferably 1.8 to 10, more preferably 1.8 to 3 as measured by GPC as described below in the test methods; and/or
3. a Tm (second melt) of 30 to 200° C., preferably 30 to 185° C., preferably 50 to 175, more preferably 60 to 170 as measured by the DSC method described below in the test methods; and/or
4. a crystallinity of 5 to 80%, preferably 10 to 70, more preferably 20 to 60% as measured by the DSC method described below in the test methods; and/or
5. a glass transition temperature (Tg) of −40° C. to 20° C., preferably −20° C. to 10° C., more preferably −10° C. to 5° C. as measured by the DMTA method described below in the test methods; and/or
6. a heat of fusion (Hf) of 180 J/g or less, preferably 20 to 150 J/g, more preferably 40 to 120 J/g as measured by the DSC method described below in the test methods; and/or
7. a crystallization temperature (Tc) of 15 to 120° C., preferably 20 to 115° C., more preferably 25 to 110° C., preferably 60 to 145° C., as measured by the method described below in the test methods; and/or
8. a heat deflection temperature of 45 to 140° C., preferably 60 to 135° C., more preferably 75 to 125° C. as measured by the method described below in the test methods; and/or
9. a Rockwell hardness (R scale) of 25 or more, preferably 40 or more, preferably 60 or more, preferably 80 or more, preferably 100 or more, preferably from 25 to 125; and/or
10. a percent crystallinity of at least 30%, preferably at least 40%, alternatively at least 50%, as measured by the method described below in the test methods; and/or
11. a percent amorphous content of at least 50%, alternatively at least 60%, alternatively at least 70%, even alternatively between 50 and 95%, or 70% or less, preferably 60% or less, preferably 50% or less as determined by subtracting the percent crystallinity from 100, and/or
12. a branching index (g') of 0.2 to 2.0, preferably 0.5 to 1.5, preferably 0.7 to 1.1, as measured by the method described below.

In one embodiment the propylene homopolymer has a molecular weight distribution (Mw/Mn) of up to 40, preferably ranging from 1.5 to 10, and from 1.8 to 7 in another embodiment, and from 1.9 to 5 in yet another embodiment, and from 2.0 to 4 in yet another embodiment. In another embodiment the propylene homopolymer has a Gardner impact strength, tested on 0.125 inch disk at 23° C., that may range from 20 in-lb to 1000 in-lb in one embodiment, and from 30 in-lb to 500 in-lb in another embodiment, and from 40 in-lb to 400 in-lb in yet another embodiment. In yet another embodiment, the 1% secant flexural modulus may range from 100 MPa to 2300 MPa, and from 200 MPa to 2100 MPa in another embodiment, and from 300 MPa to 2000 MPa in yet another embodiment, wherein a desirable polypropylene may exhibit any combination of any upper flexural modulus limit with any lower flexural modulus limit. The melt flow rate (MFR) (ASTM D 1238, 230° C., 2.16 kg) of preferred propylene polymers range from 0.1 dg/min to 2500 dg/min in one embodiment, and from 0.3 to 500 dg/min in another embodiment.

The polypropylene homopolymer or propylene copolymer useful in the present invention may have some level of isotacticity. Thus, in one embodiment, a polyolefin comprising isotactic polypropylene is a useful polymer in the invention of this patent, and similarly, highly isotactic polypropylene is useful in another embodiment. As used herein, "isotactic" is defined as having at least 10% isotactic pentads according to analysis by $^{13}$C-NMR as described in the test methods below. As used herein, "highly isotactic" is defined as having at least 60% isotactic pentads according to analysis by $^{13}$C-NMR. In a desirable embodiment, a polypropylene homopolymer having at least 85% isotacticity is the polyolefin, and at least 90% isotacticity in yet another embodiment.

In another desirable embodiment, a polypropylene homopolymer has at least 85% syndiotacticity, and at least 90% syndiotacticity in yet another embodiment. As used herein, "syndiotactic" is defined as having at least 10% syndiotactic pentads according to analysis by $^{13}$C-NMR as described in the test methods below. As used herein, "highly syndiotactic" is defined as having at least 60% syndiotactic pentads according to analysis by $^{13}$C-NMR.

In another embodiment the propylene homoploymer may be isotactic, highly isotactic, syndiotactic, highly syndiotactic or atactic. Atactic polypropylene is defined to be less than 10% isotactic or syndiotactic pentads. Preferred atactic polypropylenes typically have an Mw of 20,000 up to 1,000,000.

Preferred propylene polymers useful herein include those produced by metallocene catalyst systems including those propylene polymers having a composition distribution breadth index (CDBI) of 60% or more, preferably 70% or more, preferably 80% or more, preferably 90% or more. (CDBI is measured as described in WO 93/03093, with the modification that any fractions having a weight average molecular weight (Mw) below 25,000 g/mol are disregarded.) Preferred propylene polymers that can be used in the practice of this invention include those propylene polymers sold by ExxonMobil Chemical Company under the tradename ACHIEVE™. Particularly useful grades include ACHIEVE™ 3854, ACHIEVE™ 1654E1, ACHIEVE™ 3825, ACHIEVE™ 1605, available from ExxonMobil Chemical Company in Houston, Tex. Additional preferred HMPP's useful in the practice of this invention include those propylene homopolymers, and random copolymers available from ExxonMobil Chemical Company under the grade names: PP1024E4, PP1042, PP1032, PP1044, PP1052, PP1105E1, PP3155 and PP9852E1, PP9272, PP9513, PP9544, PP9562. In some instances impact copolymers (ICP) can be utilized in the practice of this invention. Several are available from ExxonMobil Chemical Company (e.g. PP7032 E2). Preferred ICP's useful as the HMPP may also be those ICP's described in WO 2004/014998, particularly those described at page 37 to page 41.

In another embodiment of the invention, the propylene polymer is a copolymer, either random, or block, of propylene derived units and units selected from ethylene and $C_4$ to $C_{20}$ α-olefin derived units, typically from ethylene and $C_4$ to $C_{10}$ α-olefin derived units in another embodiment. The ethylene or $C_4$ to $C_{20}$ α-olefin derived units are present from 0.1 wt % to 50 wt % of the copolymer in one embodiment, and from 0.5 to 30 wt % in another embodiment, and from 1 to 15 wt % in yet another embodiment, and from 0.1 to 5 wt % in yet another embodiment, wherein a desirable copolymer comprises ethylene and $C_4$ to $C_{20}$ α-olefin derived units in any combination of any upper wt % limit with any lower wt % limit described herein. The propylene copolymer will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 in yet another embodiment, wherein a desirable copolymer may comprise any upper molecular weight limit with any lower molecular weight limit described herein.

Particularly desirable propylene copolymers have a molecular weight distribution (Mw/Mn) ranging from 1.5 to 10, and from 1.6 to 7 in another embodiment, and from 1.7 to 5 in yet another embodiment, and from 1.8 to 4 in yet another embodiment. The Gardner impact strength, tested on 0.125 inch disk at 23° C., of the propylene copolymer may range from 20 in-lb to 1000 in-lb in one embodiment, and from 30 in-lb to 500 in-lb in another embodiment, and from 40 in-lb to 400 in-lb in yet another embodiment. In yet another embodiment, the 1% secant flexural modulus of the propylene copolymer ranges from 100 MPa to 2300 MPa, and from 200 MPa to 2100 MPa in another embodiment, and from 300 MPa to 2000 MPa in yet another embodiment, wherein a desirable polyolefin may exhibit any combination of any upper flexural modulus limit with any lower flexural modulus limit. The melt flow rate (MFR) (ASTM D 1238, 230° C., 2.16 kg) of propylene copolymer ranges from 0.1 dg/min to 2500 dg/min in one embodiment, and from 0.3 to 500 dg/min in another embodiment.

In another embodiment the propylene polymer may be a propylene copolymer comprising propylene and one or more other monomers selected from the group consisting of ethylene and $C_4$ to $C_{20}$ linear, branched or cyclic monomers, and in some embodiments is a $C_4$ to $C_{12}$ linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. The monomers may be present at up to 50 weight %, preferably from 0 to 40 weight %, more preferably from 0.5 to 30 weight %, more preferably from 2 to 30 weight %, more preferably from 5 to 20 weight %.

Preferred linear alpha-olefins useful as comonomers for the propylene copolymers useful in this invention include $C_3$ to $C_8$ alpha-olefins, more preferably 1-butene, 1-hexene, and 1-octene, even more preferably 1-butene. Preferred linear alpha-olefins useful as comonomers for the butene copolymers useful in this invention include $C_3$ to $C_8$ alpha-olefins, more preferably propylene, 1-hexene, and 1-octene, even more preferably propylene. Preferred branched alpha-olefins include 4-methyl-1-pentene, 3-methyl-1-pentene, and 3,5,5-trimethyl-1-hexene, 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to C1 to $C_{10}$ alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene.

Non aromatic cyclic group containing monomers are also preferred. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, C1 to C10 alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane and the like.

Preferred diolefin comonomers useful in this invention include any hydrocarbon structure, preferably C4 to C30, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a preferred embodiment one or more dienes are present in the polymer produced herein at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

In another embodiment the propylene copolymer is a random copolymer, also known as an "RCP," comprising propylene and up to 20 mole % of ethylene or a $C_4$ to $C_{20}$ olefin, preferably up to 20 mole % ethylene.

In another embodiment, the polyolefin may be an impact copolymer (ICP) or block copolymer. Propylene impact copolymers are commonly used in a variety of applications where strength and impact resistance are desired such as molded and extruded automobile parts, household appliances, luggage and furniture. Propylene homopolymers alone are often unsuitable for such applications because they are too brittle and have low impact resistance particularly at low temperature, whereas propylene impact copolymers are specifically engineered for applications such as these.

A typical propylene impact copolymer contains at least two phases or components, e.g., a homopolymer component and a copolymer component. The impact copolymer may also comprise three phases such as a PP/EP/PE combination with the PP continuous and a dispersed phase with EP outside and PE inside the dispersed phase particles. These components are usually produced in a sequential polymerization process wherein the homopolymer produced in a first reactor is transferred to a second reactor where copolymer is produced and incorporated within the matrix of the homopolymer component. The copolymer component has rubbery characteristics and provides the desired impact resistance, whereas the homopolymer component provides overall stiffness.

Another important feature of ICP's is the amount of amorphous polypropylene they contain. The ICP's of this invention are characterized as having low amorphous polypropylene, preferably less than 3% by weight, more preferably less than 2% by weight, even more preferably less than 1% by weight and most preferably there is no measurable amorphous polypropylene. Percent amorphous polypropylene is determined by the method described below in the test methods.

Preferred impact copolymers may be a reactor blend (in situ blend) or a post reactor (ex-situ) blend. In one embodiment, a suitable impact copolymer comprises from 40% to 95% by weight Component A and from 5% to 60% by weight Component B based on the total weight of the impact copolymer; wherein Component A comprises propylene homopolymer or copolymer, the copolymer comprising 10% or less by weight ethylene, butene, hexene or octene comonomer; and wherein Component B comprises propylene copolymer, wherein the copolymer comprises from 5% to 70% by weight ethylene, butene, hexene and/or octene comonomer, and from about 95% to about 30% by weight propylene. In one embodiment of the impact copolymer, Component B consists essentially of propylene and from about 30% to about 65% by weight ethylene. In another embodiment, Component B comprises ethylene-propylene copolymers, ethylene-propylene-diene terpolymers, ethylene-acrylate copolymers, ethylene-vinyl acetate, styrene-butadiene copolymers, ethylene-acrylic ester copolymers, polybutadiene, polyisoprene, natural rubber, isobutylene, hydrocarbon resin (the hydrocarbon resin being characterized by a molecular weight less than 5000, a $T_g$ of about 50 to 100° C. and a softening point, Ring and Ball, as measured by ASTM E-28, of less than about 140° C.), rosin ester, and mixtures thereof. In another embodiment, Component B has a molecular weight distribution of less than 3.5. In yet another embodiment, Component B has a weight average molecular weight of at least 20,000. A useful impact copolymer is disclosed in, for example, U.S. Pat. No. 6,342,566 and U.S. Pat. No. 6,384,142.

Component B is most preferably a copolymer consisting essentially of propylene and ethylene although other propylene copolymers, ethylene copolymers or terpolymers may be suitable depending on the particular product properties desired. For example, propylene/butene, hexene or octene copolymers, and ethylene/butene, hexene or octene copolymers may be used, and propylene/ethylene/hexene-1 terpolymers may be used. In a preferred embodiment though, Component B is a copolymer comprising at least 40% by weight propylene, more preferably from about 80% by weight to about 30% by weight propylene, even more preferably from about 70% by weight to about 35% by weight propylene. The comonomer content of Component B is preferably in the range of from about 20% to about 70% by weight comonomer, more preferably from about 30% to about 65% by weight comonomer, even more preferably from about 35% to about 60% by weight comonomer. Most preferably Component B consists essentially of propylene and from about 20% to about 70% ethylene, more preferably from about 30% to about 65% ethylene, and most preferably from about 35% to about 60% ethylene.

For other Component B copolymers, the comonomer contents will need to be adjusted depending on the specific properties desired. For example, for ethylene/hexene copolymers, Component B should contain at least 17% by weight hexene and at least 83% by weight ethylene.

Component B, preferably has a narrow molecular weight distribution Mw/Mn ("MWD"), i.e., lower than 5.0, preferably lower than 4.0, more preferably lower than 3.5, even more preferably lower than 3.0 and most preferably 2.5 or lower. These molecular weight distributions should be obtained in the absence of visbreaking or peroxide or other post reactor treatment molecular weight tailoring. Component B preferably has a weight average molecular weight (Mw as determined by GPC) of at least 100,000, preferably at least 150,000, and most preferably at least 200,000.

Component B preferably has an intrinsic viscosity greater than 1.00 dl/g, more preferably greater than 1.50 dl/g and most preferably greater than 2.00 dl/g. The term "intrinsic viscosity" or "IV" is used conventionally herein to mean the viscosity of a solution of polymer such as Component B in a given solvent at a given temperature, when the polymer composition is at infinite dilution. According to the ASTM standard test method D 1601-78, IV measurement involves a standard capillary viscosity measuring device, in which the viscosity of a series of concentrations of the polymer in the solvent at the given temperature are determined. For Component B, decalin is a suitable solvent and a typical temperature is 135° C. From the values of the viscosity of solutions of varying concentrations, the "value" at infinite dilution can be determined by extrapolation.

Component B preferably has a composition distribution breadth index (CDBI) of greater than 60%, more preferably greater than 65%, even more preferably greater than 70%, even more preferably greater than 75%, still more preferably greater than 80%, and most preferably greater than 85%. CDBI defines the compositional variation among polymer chains in terms of ethylene (or other comonomer) content of the copolymer as a whole. A measure of composition distribution is the "Composition Distribution Breadth Index" ("CDBI") as defined in U.S. Pat. No. 5,382,630 which is hereby incorporate by reference. CDBI is defined as the weight percent of the copolymer molecules having a comonomer content within 50% of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, vol. 20, p. 441 (1982) and U.S. Pat. No. 5,008,204, which are incorporated herein by reference.

Component B of the ICP's preferably has low crystallinity, preferably less than 10% by weight of a crystalline portion, more preferably less than 5% by weight of a crystalline portion. Where there is a crystalline portion of Component B, its composition is preferably the same as or at least similar to (within 15% by weight) the remainder of Component B in terms of overall comonomer weight percent.

The preferred melt flow rate ("MFR") of these ICP's depends on the desired end use but is typically in the range of from about 0.2 dg/min to about 200 dg/min, more preferably from about 5 dg/min to about 100 dg/min. Significantly, high MFRs, i.e., higher than 50 dg/min are obtainable. The ICP preferably has a melting point (Tm) of at least 145° C., preferably at least 150° C., more preferably at least 152° C., and most preferably at least 155° C.

The ICP's comprise from about 40% to about 95% by weight Component A and from about 5% to about 60% by weight Component B, preferably from about 50% to about 95% by weight Component A and from about 5% to about 50% Component B, even more preferably from about 60% to about 90% by weight Component A and from about 10% to about 40% by weight Component B. In the most preferred embodiment, the ICP consists essentially of Components A and B. The overall comonomer (preferably ethylene) content of the total ICP is preferably in the range of from about 2% to about 30% by weight, preferably from about 5% to about 25% by weight, even more preferably from about 5% to about 20% by weight, still more preferably from about 5% to about 15% by weight comonomer.

In another embodiment a preferred impact copolymer composition is prepared by selecting Component A and Component B such that their refractive indices (as measured by ASTM D 542-00) are within 20% of each other, preferably within 15%, preferably 10, even more preferably within 5% of each other. This selection produces impact copolymers with outstanding clarity. In another embodiment a preferred impact copolymer composition is prepared by selecting a blend of Component A and an NFP and a blend of Component B and an NFP such that refractive indices of the blends (as measured by ASTM D 542-00) are within 20% of each other, preferably within 15%, preferably 10, even more preferably within 5% of each other.

In yet another embodiment, the Gardner impact strength, tested on 0.125 inch disk at −29° C., of the propylene impact copolymer ranges from 20 in-lb to 1000 in-lb, and from 30 in-lb to 500 in-lb in another embodiment, and from 40 in-lb to 400 in-lb in yet another embodiment. Further, the 1% secant flexural modulus of the propylene impact copolymer may range from 100 MPa to 2300 MPa in one embodiment, and from 200 MPa to 2100 MPa in another embodiment, and from 300 MPa to 2000 MPa in yet another embodiment, wherein a desirable polyolefin may exhibit any combination of any upper flexural modulus limit with any lower flexural modulus limit. The melt flow rate (MFR) (ASTM D 1238, 230° C., 2.16 kg) of desirable homopolymers ranges from 0.1 dg/min to 2500 dg/min in one embodiment, and from 0.3 to 500 dg/min in another embodiment.

Another suitable propylene polymer comprises a blend of a polypropylene homopolymer or propylene copolymer with a plastomer. The plastomers that are useful in the present invention may be described as polyolefin copolymers having a density of from 0.85 to 0.915 g/cm$^3$ ASTM D 4703 Method B and ASTM D 1505—the first of these is compression molding at a cooling rate of 15° C./min and the second is the Gradient Density Column method for density determination and a melt index (MI) between 0.10 and 30 dg/min (ASTM D 1238; 190° C., 2.1 kg). In one embodiment, the useful plastomer is a copolymer of ethylene derived units and at least one of $C_3$ to $C_{10}$ α-olefin derived units, the copolymer having a density less than 0.915 g/cm$^3$. The amount of comonomer ($C_3$ to $C_{10}$ α-olefin derived units) present in the plastomer ranges from 2 wt % to 35 wt % in one embodiment, and from 5 wt % to 30 wt % in another embodiment, and from 15 wt % to 25 wt % in yet another embodiment, and from 20 wt % to 30 wt % in yet another embodiment.

The plastomer useful in the invention has a melt index (MI) of between 0.10 and 20 dg/min in one embodiment, and from 0.2 to 10 dg/min in another embodiment, and from 0.3 to 8 dg/min in yet another embodiment. The average molecular weight of useful plastomers ranges from 10,000 to 800,000 in one embodiment, and from 20,000 to 700,000 in another embodiment. The 1% secant flexural modulus (ASTM D 790) of useful plastomers ranges from 10 MPa to 150 MPa in one embodiment, and from 20 MPa to 100 MPa in another embodiment. Further, the plastomer that is useful in compositions of the present invention has a melting temperature ($T_m$) of from 30 to 80° C. (first melt peak) and from 50 to 125° C. (second melt peak) in one embodiment, and from 40 to 70° C. (first melt peak) and from 50 to 100° C. (second melt peak) in another embodiment.

Plastomers useful in the present invention are metallocene catalyzed copolymers of ethylene derived units and higher α-olefin derived units such as propylene, 1-butene, 1-hexene and 1-octene, and which contain enough of one or more of these comonomer units to yield a density between 0.860 and 0.900 g/cm$^3$ in one embodiment. The molecular weight distribution (Mw/Mn) of desirable plastomers ranges from 1.5 to 5 in one embodiment, and from 2.0 to 4 in another embodiment. Examples of a commercially available plastomers are EXACT 4150, a copolymer of ethylene and 1-hexene, the 1-hexene derived units making up from 18 to 22 wt % of the plastomer and having a density of 0.895 g/cm$^3$ and MI of 3.5 dg/min (ExxonMobil Chemical Company, Houston, Tex.); and EXACT 8201, a copolymer of ethylene and 1-octene, the 1-octene derived units making up from 26 to 30 wt % of the plastomer, and having a density of 0.882 g/cm$^3$ and MI of 1.0 dg/min (ExxonMobil Chemical Company, Houston, Tex.).

In another embodiment propylene polymers that are useful in this invention include homopolymers and random copolymers of propylene having a heat of fusion as determined by Differential Scanning calorimetry (DSC) of less than 50 J/g, a melt index (MI) of less than 20 dg/min and or an MFR of 20 dg/min or less, and contains stereoregular propylene crystallinity preferably isotactic stereoregular propylene crystallinity. In another embodiment the polymer is a random copolymer of propylene and at least one comonomer selected from ethylene, $C_4$-$C_{12}$ α-olefins, and combinations thereof. Preferably the random copolymers of propylene comprises from 2 wt % to 25 wt % polymerized ethylene units, based on the total weight of the polymer; has a narrow composition distribution; has a melting point (Tm) of from 25° C. to 120° C., or from 35° C. to 80° C.; has a heat of fusion within the range having an upper limit of 50 J/g or 25 J/g and a lower limit of 1 J/g or 3 J/g; has a molecular weight distribution Mw/Mn of from 1.8 to 4.5; and has a melt index (MI) of less than 20 dg/min, or less than 15 dg/min. The intermolecular composition distribution of the copolymer is determined by thermal fractionation in a solvent. A typical solvent is a saturated hydrocarbon such as hexane or heptane. The thermal fractionation procedure is described below. Typically, approximately 75% by weight, preferably 85% by weight, of the copolymer is isolated as one or two adjacent, soluble fractions with the balance of the copolymer in immediately preceding or succeeding fractions. Each of these fractions has a composition (wt % comonomer such as ethylene or other α-olefin) with a difference of no greater than 20% (relative), preferably 10% (relative), of the average weight % comonomer of the copolymer. The copolymer has a narrow composition distribution if it meets the fractionation test described above.

A particularly preferred polymer useful in the present invention is an elastic polymer with a moderate level of crystallinity due to stereoregular propylene sequences. The polymer can be: (A) a propylene homopolymer in which the stereoregularity is disrupted in some manner such as by regio-inversions; (B) a random propylene copolymer in which the propylene stereoregularity is disrupted at least in part by comonomers; or (C) a combination of (A) and (B).

In one embodiment, the propylene polymer further includes a non-conjugated diene monomer to aid in vulcanization and other chemical modification of the blend composition. The amount of diene present in the polymer is preferably less than 10% by weight, and more preferably less than 5% by weight. The diene may be any non-conjugated diene which is commonly used for the vulcanization of ethylene propylene rubbers including, but not limited to, ethylidene norbornene, vinyl norbornene, and dicyclopentadiene.

In one embodiment, the polymer is a random copolymer of propylene and at least one comonomer selected from ethylene, $C_4$-$C_{12}$ α-olefins, and combinations thereof. In a particular aspect of this embodiment, the copolymer includes ethylene-derived units in an amount ranging from a lower limit of 2%, 5%, 6%, 8%, or 10% by weight to an upper limit of 20%, 25%, or 28% by weight. This embodiment will also include propylene-derived units present in the copolymer in an amount ranging from a lower limit of 72%, 75%, or 80% by weight to an upper limit of 98%, 95%, 94%, 92%, or 90% by weight. These percentages by weight are based on the total weight of the propylene and ethylene-derived units; i.e., based on the sum of weight percent propylene-derived units and weight percent ethylene-derived units being 100%. The ethylene composition of a polymer can be measured as follows. A thin homogeneous film is pressed at a temperature of about 150° C. or greater, then mounted on a Perkin Elmer PE 1760 infrared spectrophotometer. A full spectrum of the sample from 600 cm$^{-1}$ to 4000 cm$^{-1}$ is recorded and the monomer weight percent of ethylene can be calculated according to the following equation: Ethylene wt %=82.585-111.987X+30.045 X$^2$, wherein X is the ratio of the peak height at 1155 cm$^{-1}$ and peak height at either 722 cm$^{-1}$ or 732 cm$^{-1}$, whichever is higher. The concentrations of other monomers in the polymer can also be measured using this method.

Comonomer content of discrete molecular weight ranges can be measured by Fourier Transform Infrared Spectroscopy (FTIR) in conjunction with samples collected by GPC. One such method is described in Wheeler and Willis, Applied Spectroscopy, 1993, vol. 47, pp. 1128-1130. Different but similar methods are equally functional for this purpose and well known to those skilled in the art.

Comonomer content and sequence distribution of the polymers can be measured by $^{13}$C nuclear magnetic resonance ($^{13}$C NMR), and such method is well known to those skilled in the art.

In one embodiment, the polymer is a random propylene copolymer having a narrow composition distribution. In another embodiment, the polymer is a random propylene copolymer having a narrow composition distribution and a melting point of from 25° C. to 110° C. The copolymer is described as random because for a polymer comprising propylene, comonomer, and optionally diene, the number and distribution of comonomer residues is consistent with the random statistical polymerization of the monomers. In stereoblock structures, the number of block monomer residues of any one kind adjacent to one another is greater than predicted from a statistical distribution in random copolymers with a similar composition. Historical ethylene-propylene copolymers with stereoblock structure have a distribution of ethylene residues consistent with these blocky structures rather than a random statistical distribution of the monomer residues in the polymer. The intramolecular composition distribution (i.e., randomness) of the copolymer may be determined by $^{13}$C NMR, which locates the comonomer residues in relation to the neighbouring propylene residues. The intermolecular composition distribution of the copolymer is determined by thermal fractionation in a solvent. A typical solvent is a saturated hydrocarbon such as hexane or heptane. Typically, approximately 75% by weight, preferably 85% by weight, of the copolymer is isolated as one or two adjacent, soluble fractions with the balance of the copolymer in immediately preceding or succeeding fractions. Each of these fractions has a composition (wt % comonomer such as ethylene or other α-olefin) with a difference of no greater than 20% (relative), preferably 10% (relative), of the average weight % comonomer of the copolymer. The copolymer has a narrow composition distribution if it meets the fractionation test described above. To produce a copolymer having the desired randomness and narrow composition, it is beneficial if (1) a single sited metallocene catalyst is used which allows only a single statistical mode of addition of the first and second monomer sequences and (2) the copolymer is well-mixed in a continuous flow stirred tank polymerization reactor which allows only a single polymerization environment for substantially all of the polymer chains of the copolymer.

The crystallinity of the polymers may be expressed in terms of heat of fusion. Embodiments of the present invention include polymers having a heat of fusion, as determined by DSC, ranging from a lower limit of 1.0 J/g, or 3.0 J/g, to an upper limit of 50 J/g, or 10 J/g. Without wishing to be bound by theory, it is believed that the polymers of embodiments of the present invention have generally isotactic crystallizable propylene sequences, and the above heats of fusion are believed to be due to the melting of these crystalline segments.

The crystallinity of the polymer may also be expressed in terms of crystallinity percent. The thermal energy for the highest order of polypropylene is estimated at 207 J/g. That is, 100% crystallinity is equal to 207 J/g. Preferably, the polymer has a polypropylene crystallinity within the range having an upper limit of 65%, 40%, 30%, 25%, or 20%, and a lower limit of 1%, 3%, 5%, 7%, or 8%.

The level of crystallinity is also reflected in the melting point. The term "melting point," as used herein, is the highest temperature peak, highest meaning the largest amount of polymer being reflected as opposed to the peak occurring at the highest temperature among principal and secondary melting peaks as determined by DSC, discussed above. In one embodiment of the present invention, the polymer has a single melting point. Typically, a sample of propylene copolymer will show secondary melting peaks adjacent to the principal peak, which are considered together as a single melting point. The highest of these peaks is considered the melting point. The polymer preferably has a melting point by DSC ranging from an upper limit of 110° C., 105° C., 90° C., 80° C., or 70° C., to a lower limit of 0° C., 20° C., 25° C., 30° C., 35° C., 40° C., or 45° C.

Such polymers used in the invention have a weight average molecular weight (Mw) within the range having an upper limit of 5,000,000 g/mol, 1,000,000 g/mol, or 500,000 g/mol, and a lower limit of 10,000 g/mol, 20,000 g/mol, or 80,000 g/mol, and a molecular weight distribution Mw/Mn (MWD), sometimes referred to as a "polydispersity index" (PDI), ranging from a lower limit of 1.5, 1.8, or 2.0 to an upper limit of 40, 20, 10, 5, or 4.5. In one embodiment, the polymer has a Mooney viscosity, ML(1+4) @ 125° C., of 100 or less, 75 or less, 60 or less, or 30 or less. Mooney viscosity, as used herein, can be measured as ML(1+4) @ 125° C. according to ASTM D1646, unless otherwise specified.

The polymers used in embodiments of the present invention can have a tacticity index (m/r) ranging from a lower limit of 4 or 6 to an upper limit of 8, 10, or 12. The tacticity index, expressed herein as "m/r", is determined by $^{13}$C nuclear magnetic resonance (NMR). The tacticity index m/r is calculated as defined in H. N. Cheng, *Macromolecules,* 17, 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, and an m/r ratio of 1.0 an atactic material, and an m/r ratio of greater than 1.0 an isotactic material. An isotactic material theoretically may have a ratio approaching infinity, and many by-product atactic polymers have sufficient isotactic content to result in ratios of greater than 50.

In one embodiment, the polymer has isotactic stereoregular propylene crystallinity. The term "stereoregular" as used herein means that the predominant number, i.e. greater than 80%, of the propylene residues in the polypropylene or in the polypropylene continuous phase of a blend, such as impact copolymer exclusive of any other monomer such as ethylene, has the same 1,2 insertion and the stereochemical orientation of the pendant methyl groups is the same, either meso or racemic.

An ancillary procedure for the description of the tacticity of the propylene units of embodiments of the current invention is the use of triad tacticity. The triad tacticity of a polymer is the relative tacticity of a sequence of three adjacent propylene units, a chain consisting of head to tail bonds, expressed as a binary combination of m and r sequences. It is usually expressed for copolymers of the present invention as the ratio of the number of units of the specified tacticity to all of the propylene triads in the copolymer.

The triad tacticity (mm fraction) of a propylene copolymer can be determined from a $^{13}$C NMR spectrum of the propylene copolymer and the following formula:

$$\text{mm Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

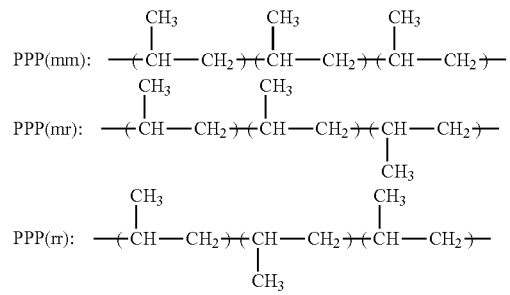

The $^{13}$C NMR spectrum of the propylene copolymer is measured as described in U.S. Pat. No. 5,504,172. The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal Polymer, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm).

The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

The polymers of embodiments of the present invention have a triad tacticity of three propylene units, as measured by $^{13}$C NMR, of 75% or greater, 80% or greater, 82% or greater, 85% or greater, or 90% or greater.

In embodiments of the present invention, the polymer has a melt index (MI) of 20 dg/min or less, 7 dg/min or less, 5 dg/min or less, or 2 dg/min or less, or less than 2 dg/min. The determination of the MI of the polymer is according to ASTM D1238 (190° C., 2.16 kg). In this version of the method a portion of the sample extruded during the test was collected and weighed. This is commonly referred to as the modification 1 of the experimental procedure. The sample analysis is conducted at 190° C. with a 1 minute preheat on the sample to provide a steady temperature for the duration of the experiment.

In one embodiment, the polymer used in the present invention is described in detail as the "Second Polymer Component (SPC)" in WO 00/69963, WO 00/01766, WO 99/07788, WO 02/083753, and described in further detail as the "Propylene Olefin Copolymer" in WO 00/01745, all of which are fully incorporated by reference herein for purposes of U.S. patent practice.

The polypropylene suitable for use in the present invention can be in any physical form when used to blend with the NFP and slip additive of the invention. In one embodiment, reactor granules, defined as the granules of polymer that are isolated from the polymerization reactor prior to any processing procedures, are used to blend with the NFP and slip additive of the invention. The reactor granules have an average diameter of from 50 µm to 10 mm in one embodiment, and from 10 µm to 5 mm in another embodiment. In another embodiment, the polypropylene is in the form of pellets, such as, for example, having an average diameter of from 1 mm to 10 mm that are formed from melt extrusion of the reactor granules.

In one embodiment of the invention, the propylene polymers suitable for the composition excludes physical blends of polypropylene with other polyolefins, and in particular, excludes physical blends of polypropylene with low molecular weight (500 to 10,000 g/mol) polyethylene or polyethylene copolymers, meaning that, low molecular weight polyethylene or polyethylene copolymers are not purposefully added in any amount to the polyolefin (e.g., polypropylene homopolymer or copolymer) compositions of the invention, such as is the case in, for example, WO 01/18109 A1.

In a preferred embodiment, the NFP is a polyalphaolefin comprising $C_{10}$ to $C_{100}$ n-paraffins. The propylene polymer may be a polypropylene homopolymer, copolymer, impact copolymer, or blend thereof, and may include a plastomer. Non-limiting examples of desirable articles of manufacture made from compositions of the invention include films, sheets, fibers, woven and nonwoven fabrics, tubes, pipes, automotive components, furniture, sporting equipment, food storage containers, transparent and semi-transparent articles, toys, tubing and pipes and medical devices. In one embodiment, the articles of manufacture comprise fibers, woven and nonwoven fabrics and articles made from the fibers and fabrics. The compositions of the invention may be characterized by having an improved (decreased) $T_g$, coefficient of friction and total hand, relative to the starting polypropylene, while maintaining other desirable properties.

The polypropylene, NFP and slip additive can be blended by any suitable means, and are typically blended to obtain a homogeneous, single phase mixture. For example, they may be blended in a tumbler, static mixer, batch mixer, extruder, or a combination thereof. The mixing step may take place as part of a processing method used to fabricate articles, such as in the extruder on an injection molding machine or fiber line.

The enhanced properties of the plasticized polyolefin compositions described herein are useful in a wide variety of applications, including transparent articles such as cook and storage ware, and in other articles such as furniture, automotive components, toys, sportswear, medical devices, sterilizable medical devices and sterilization containers, nonwoven fibers and fabrics and articles therefrom such as drapes, gowns, filters, hygiene products, diapers, and films, oriented films, sheets, tubes, pipes and other items where softness, high impact strength, and impact strength below freezing is important. Fabrication of the plasticized polyolefins of the invention to form these articles may be accomplished by injection molding, extrusion, thermoforming, blow molding, rotomolding, spunbonding, meltblowing, fiber spinning, blown film, stretching for oriented films, and other common processing methods. The enhanced properties of the plasticized polypropylene compositions described herein are particularly useful in nonwoven fibers and fabrics and articles therefrom such as drapes, gowns, filters, hygiene products, diapers, and other items where condrapability, softness, and good tensile strength are important. Fabrication of the plasticized polyolefins of the invention to form these articles may be accomplished by extrusion, spunbonding, meltblowing, fiber spinning, and other common fiber formation processing methods.

In one embodiment of compositions of the present invention, conventional plasticizers such as are commonly used for poly(vinyl chloride) are substantially absent. In particular, plasticizers such as phthalates, adipates, trimellitate esters, polyesters, and other functionalized plasticizers as disclosed in, for example, U.S. Pat. No. 3,318,835; U.S. Pat. No. 4,409, 345; WO 02/31044 A1; and PLASTICS ADDITIVES 499-504 (Geoffrey Pritchard, ed., Chapman & Hall 1998) are substantially absent. By "substantially absent", it is meant that these compounds are not added deliberately to the compositions and if present at all, are present at less than 0.5 weight %.

Oils such as naphthenic and other aromatic containing oils are present to less than 0.5 wt % of the compositions of the invention in a further embodiment. Also, aromatic moieties and carbon-carbon unsaturation are substantially absent from the non-functionalized plasticizers used in the present invention in yet another embodiment. Aromatic moieties include a compound whose molecules have the ring structure characteristic of benzene, naphthalene, phenanthrene, anthracene, etc. By "substantially absent", it is meant that these aromatic compounds or moieties are not added deliberately to the compositions, and if present, are present to less than 0.5 wt % of the composition.

In another embodiment of compositions of the present invention, conventional plasticizers, elastomers, or "compatibilizers" such as low molecular weight polyethylene are substantially absent. In particular, ethylene homopolymers and copolymers having a weight average molecular weight of from 500 to 10,000 are substantially absent. Such polyethylene compatibilizers are disclosed in, for example, WO 01/18109 A1. By "substantially absent", it is meant that these compounds are not added deliberately to the compositions and, if present, are present at less than 5 weight %, more preferably less than 4 weight %, more preferably less than 3 weight %, more preferably less than 2 weight %, more preferably less than 1 weight %, more preferably less than 0.5 weight %, based upon the weight of the propylene polymer, the slip additive and the NFP.

In another embodiment the composition of this invention comprises A composition comprising 1) from 1 to 98 weight % of a first propylene polymer having a melting point of 100° C. or more, 2) from 5 to 98 weight % of a second propylene polymer having a heat of fusion of 70 J/g or less and a tacticity index of 75% or more, 3) from 0.5 to 75 weight % of a non-functionalized plasticizer ("NFP") having a viscosity index of 120 or more, and 4) from 0.001 to 10 weight % of a slip agent, based upon the weight of the first polymer, second polymer, the slip agent, and the NFP.

Preparing the Polyolefin/NFP/Slip Agent Blend

The polyolefin suitable for use in the present invention can be in any physical form when used to blend with the NFP and slip agent of the invention. In one embodiment, reactor granules, defined as the granules of propylene polymer that are isolated from the polymerization reactor prior to any processing procedures, are used to blend with the NFP and slip additive of the invention. The reactor granules have an average diameter of from 50 µm to 10 mm in one embodiment, and from 10 µm to 5 mm in another embodiment. In another embodiment, the polypropylene is in the form of pellets, such as, for example, having an average diameter of from 1 mm to 10 mm that are formed from melt extrusion of the reactor granules.

In one embodiment of the invention, the polymer suitable for the composition excludes physical blends of polypropylene with other polyolefins, and in particular, excludes physical blends of polypropylene with low molecular weight (500 to 10,000 g/mol) polyethylene or polyethylene copolymers, meaning that, low molecular weight polyethylene or polyethylene copolymers are not purposefully added in any amount to the polyolefin (e.g., polypropylene homopolymer or copolymer) compositions of the invention, such as is the case in, for example, WO 01/18109 A1.

The polypropylene, slip additive and NFP can be blended by any suitable means, and are typically blended to obtain a homogeneous, single phase mixture. For example, they may be blended in a tumbler, static mixer, batch mixer, extruder, or a combination thereof. The mixing step may take place as part of a processing method used to fabricate articles, such as in the extruder on an injection molding machine or fiber line.

The NFP and slip agent can be blended with the polypropylene or other polyolefin separately or together. In one embodiment, the NFP and slip agent are blended to together as a concentrated condrapability additive composition. The additive composition can be in any suitable form for blending, such as, for example, a solution, slurry, gel, paste, masterbatch (in polyolefin), or the like. The additive contains the NFP and slip agent in the appropriate ratio for imparting condrapability to the polyolefin into which it will be blended. Generally, the additive will contain from 0.5 to 50 parts by weight of the slip agent, preferably 1 to 10 parts by weight, per 100 parts by weight of the NFP.

Depending on the physical form of the additive components, their viscosity if liquid and miscibility or solubility, the additive can vary from a solution where the additive and slip agent are both liquids or the slip agent is a solid soluble in the NFP liquid, to a slurry where the slip agent is insoluble in or immiscible with the NFP liquid, to a paste or gel where the proportion of slip agent is high and/or the NFP is thick to begin with. The NFP and slip agent can be blended together using conventional blending equipment.

In a preferred embodiment, the compositions described herein are formed into particles, granules or pellets and those particles, granules or pellets are dusted with a polyolefin powder, preferably a microfine polyolefin powder. Preferably the powder is used at 0.01-10 wt % (preferably 0.1 to 5 wt %, preferably 0.1 to 1 wt %) based upon the weight the composition. Preferred polyolefin powders are typically polyethylene (including low density PE, linear-low density PE, medium density PE, and high density PE), polypropylene, or ethylene vinyl acetate copolymers. A preferred polyolefin powder is made from polyethylene with a density 0.91 to 0.96 g/cc (preferably 0.915 to 0.925 g/cc) and an MI of 1 to 100 dg/min (preferably 5 to 50 dg/min). The polyolefin powders may have a mesh size of from 1 to 100 (preferably 5 to 100, preferably 10 to 70) and a median diameter of 5 to 2000 micron (preferably 10 to 500 micron, preferably 10 to 100 micron, preferably 15 to 25 micron). Useful polyolefin powders are available from Equistar Chemical (part of Lyondell Chemical) under the tradename Microthene™, including Microthene™ F grades and Microthene™ G grades such as Microthene™ FN510, Microthene™ FN532, Microthene™ FA700, and Microthene™ FP-800. A particularly preferred microfine powder is Microthene™ FA709-00, which is a high density polyethylene powder (0.952 g/cc) having a reported melt index of 10 dg/min, a reported melting point of 134° C., and an average particle size of 20 microns.

The concentrated NFP/slip agent additive can also be in the form of a masterbatch where the NFP and slip agent are supplied in a polyolefin matrix or other diluent at concentrations higher than will be present in the final polypropylene composition. Preferably, the concentration of the NFP in the NFP/slip agent additive is at least 10%, more preferably at least 20%, more preferably at least 50%, by weight of the masterbatch. The masterbatch polyolefin can comprise polypropylene, and or another polyolefin to be blended into the final polypropylene composition.

If desired, the concentrated NFP/slip agent additive can also include one or more other additives for the final polypropylene discussed below, e.g. antioxidants, stabilizers, colorants, fillers, tackifiers, and so on.

The polypropylene compositions of the present invention may also contain other additives. Those additives include adjuvants, oils, plasticizers, block, antiblock, color masterbatches, processing aids, neutralizers, lubricants, waxes, antioxidants, nucleating agents, acid scavengers, stabilizers, surfactants, anticorrosion agents, cavitating agents, blowing agents, other UV absorbers such as chain-breaking antioxidants, etc., quenchers, antistatic agents, pigments, dyes, fillers and cure agents such as peroxide. The additives may be present in the typically effective amounts well known in the art, such as 0.001 weight % to 10 weight %. Preferably, dyes and other colorants common in the industry may be present from 0.01 to 10 wt % in one embodiment, and from 0.1 to 6 wt % in another embodiment. Suitable nucleating agents are disclosed by, for example, H. N. Beck in *Heterogeneous Nucleating Agents for Polypropylene Crystallization*, 11 J. APPLIED POLY. SCI. 673-685 (1967) and in *Heterogeneous Nucleation Studies on Polypropylene*, 21 J. POLY. SCI.: POLY. LETTERS 347-351 (1983). Examples of suitable nucleating agents are sodium benzoate, sodium 2,2'-methylenebis(4,6-di-tert-butylphenyl)phosphate, aluminum 2,2'-methylenebis (4,6-di-tert-butylphenyl)phosphate, dibenzylidene sorbitol, di(p-tolylidene)sorbitol, di(p-ethylbenzylidene)sorbitol, bis (3,4-dimethylbenzylidene)sorbitol, and N',N'-dicyclohexyl-2,6-naphthalenedicarboxamide, and salts of disproportionated rosin esters. The foregoing list is intended to be illustrative of suitable choices of nucleating agents for inclusion in the instant formulations.

In particular, antioxidants and stabilizers such as organic phosphites, hindered amines, and phenolic antioxidants may be present in the polyolefin compositions of the invention from 0.001 to 2 wt % in one embodiment, and from 0.01 to 0.8 wt % in another embodiment, and from 0.02 to 0.5 wt % in yet another embodiment. Non-limiting examples of organic phosphites that are suitable are tris(2,4-di-tert-butylphenyl) phosphite (IRGAFOS 168) and di(2,4-di-tert-butylphenyl) pentaerithritol diphosphite (ULTRANOX 626). Non-limiting examples of hindered amines include poly[2-N,N'-di(2,2,6, 6-tetramethyl-4-piperidinyl)-hexanediamine-4-(1-amino-1, 1,3,3-tetramethylbutane)sym-triazine] (CHIMASORB 944); bis(1,2,2,6,6-pentamethyl-4-piperidyl)sebacate (TINUVIN 770). Non-limiting examples of phenolic antioxidants include pentaerythrityl tetrakis(3,5-di-tert-butyl-4-hydroxyphenyl)propionate (IRGANOX 1010); and 1,3,5-Tri(3,5-di-tert-butyl-4-hydroxybenzyl-isocyanurate (IRGANOX 3114). Preferred antioxidants include phenolic antioxidants, such as Irganox 1010, Irganox, 1076 both available from Ciba-Geigy.

Preferred oils include paraffinic or napthenic oils such as Primol 352, or Primol 876 available from ExxonMobil Chemical France, S.A. in Paris, France. More preferred oils include aliphatic napthenic oils, white oils or the like.

Fillers may be present from 0.1 to 50 wt % in one embodiment, and from 0.1 to 25 wt % of the composition in another embodiment, and from 0.2 to 10 wt % in yet another embodiment. Desirable fillers include but are not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art, and may have the NFP of the invention pre-contacted, or pre-absorbed into the filler prior to addition to the polyolefin in one embodiment.

Preferred fillers, cavitating agents and/or nucleating agents include titanium dioxide, calcium carbonate, barium sulfate, silica, silicon dioxide, carbon black, sand, glass beads, mineral aggregates, talc, clay and the like.

More particularly, in one embodiment of the present invention, the NFP and/or slip additive, or some portion of the NFP, may be blended with a filler, desirably a porous filler. The NFP, slip additive and filler may be blended by, for example, a tumbler or other wet blending apparatus. The NFP, slip additive and filler in this embodiment are blended for a time suitable to form a homogenous composition of NFP, slip additive and filler, desirably from 1 minute to 5 hours in one embodiment. This NFP/slip additive/filler blend may then be blended with the polyolefin useful in the invention in order to effectuate plastication and improved hand of the polyolefin. In another embodiment, a porous filler may be contacted with the NFP and/or slip additive, or some portion thereof, prior to contacting the filler with the polyolefin. In another embodiment, the porous filler, polyolefin, slip additive and NFP are contacted simultaneously (or in the same blending apparatus). In any case, the NFP may be present from 0.1 to 60 wt % of the composition, from 0.2 to 40 wt % in another embodiment, and from 0.3 to 20 wt % in yet another embodiment; and the slip agent may be present from 0.01 to 2 weight percent of the composition, and from 0.05 to 1 wt % in yet another embodiment.

In some embodiments the plasticized polyolefins produced by this invention may be blended with one or more other polymers, including but not limited to, thermoplastic polymer(s) and/or elastomer(s).

By "thermoplastic polymer(s)" is meant a polymer that can be melted by heat and then cooled with out appreciable change in properties. Thermoplastic polymers typically include, but are not limited to, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Preferred polyolefins include, but are not limited to, polymers comprising one or more linear, branched or cyclic $C_2$ to $C_{40}$ olefins, preferably polymers comprising propylene copolymerized with one or more $C_3$ to $C_{40}$ olefins, preferably a $C_3$ to $C_{20}$ alpha olefin, more preferably $C_3$ to $C_{10}$ alpha-olefins. More preferred polyolefins include, but are not limited to, polymers comprising ethylene including but not limited to ethylene copolymerized with a $C_3$ to $C_{40}$ olefin, preferably a $C_3$ to $C_{20}$ alpha olefin, more preferably propylene and or butene.

By elastomers is meant all natural and synthetic rubbers, including those defined in ASTM D1566. Examples of preferred elastomers include, but are not limited to, ethylene propylene rubber, ethylene propylene diene monomer rubber, styrenic block copolymer rubbers (including SI, SIS, SB, SBS, SIBS and the like, where S=styrene, I=isobutylene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans).

In another embodiment, the blend comprising the NFP may further be combined with one or more of polybutene, ethylene vinyl acetate, low density polyethylene (density 0.915 to less than 0.935 $g/cm^3$) linear low density polyethylene, ultra low density polyethylene (density 0.86 to less than 0.90 $g/cm^3$), very low density polyethylene (density 0.90 to less than 0.915 $g/cm^3$), medium density polyethylene (density 0.935 to less than 0.945 $g/cm^3$), high density polyethylene (density 0.945 to 0.98 $g/cm^3$), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, crosslinked polyethylene, copolymers of ethylene and vinyl alcohol (EVOH), polymers of aromatic monomers such as polystyrene, poly-1 esters, polyacetal, polyvinylidine fluoride, polyethylene glycols and/or polyisobutylene. Preferred polymers include those available from Exxon Chemical Company in Baytown, Tex. under the tradenames EXCEED™ and EXACT™.

In another embodiment, tackifiers may be blended with the plasticized polyolefins of this invention. Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In other embodiments the tackifier is non-polar. (Non-polar meaning that the tackifier is substantially free of monomers having polar groups. Preferably the polar groups are not present, however if they are preferably they are not present at more that 5 weight %, preferably not more that 2 weight %, even more preferably no more than 0.5 weight %.) In some embodiments the tackifier has a softening point (Ring and Ball, as measured by ASTM E-28) of 80° C. to 140° C., preferably 100° C. to 130° C. The tackifier, if present, is typically present at about 1 weight % to about 50 weight %, based upon the weight of the blend, more preferably 10 weight % to 40 weight %, even more preferably 20 weight % to 40 weight %. Preferably however, tackifier is not present, or if present, is present at less than 10 weight %, preferably less than 5 weight %, more preferably at less than 1 weight %.

More particularly, the components of the polyolefinic composition of the present invention may be blended by any suitable means to form the plasticized polyolefin, which is then suitable for further processing into useful articles. In one aspect of the invention, the polyolefin and NFP are blended, or melt blended, in an apparatus such as an extruder or batch mixer. The polyolefin may also be blended with the NFP using a tumbler, double-cone blender, ribbon blender, or other suitable blender. In yet another embodiment, the polyolefin and NFP are blended by a combination of, for example, a tumbler, followed by melt blending in an extruder. Extrusion technology for polypropylene is described in more detail in, for example, PLASTICS EXTRUSION TECHNOLOGY 26-37 (Friedhelm Hensen, ed. Hanser Publishers 1988) and in POLYPROPYLENE HANDBOOK 304-348 (Edward P. Moore, Jr. ed., Hanser Publishers 1996).

More particularly, the components of the polyolefinic composition of the present invention may be blended in solution by any suitable means to form the plasticized polyolefin, by using a solvent that dissolves both components to a significant extent. The blending may occur at any temperature or pressure where the NFP and the polyolefin remain in solution. Preferred conditions include blending at high temperatures, such as 20° C. or more, preferably 40° C. or more over the melting point of the polyolefin. For example iPP would typically be solution blended with the NFP at a temperature of 200° C. or more, preferably 220° C. or more. Such solution blending would be particularly useful in processes where the polyolefin is made by solution process and the NFP is added directly to the finishing train, rather than added to the dry polymer in another blending step altogether. Such solution blending would also be particularly useful in processes where the polyolefin is made in a bulk or high pressure process where the both the polymer and the NFP were soluble in the monomer. As with the solution process the NFP is added directly to the finishing train, rather than added to the dry polymer in another blending step altogether.

The polyolefin suitable for use in the present invention can be in any physical form when used to blend with the slip agent and NFP of the invention. In one embodiment, reactor granules, defined as the granules of polymer that are isolated from the polymerization reactor, are used to blend with the NFP of the invention. The reactor granules have an average diameter of from 10 µm to 5 mm, and from 50 µm to 10 mm in another embodiment. Alternately, the polyolefin is in the form of pellets, such as, for example, having an average diameter of from 1 mm to 6 mm that are formed from melt extrusion of the reactor granules.

One method of blending the NFP with the polyolefin is to contact the components in a tumbler, the polyolefin being in the form of reactor granules. This works particularly well with polypropylene homopolymer and random copolymer. This can then be followed, if desired, by melt blending in an extruder. Another method of blending the components is to melt blend the polyolefin pellets with the NFP directly in an extruder or Brabender.

Thus, in the cases of injection molding of various articles, simple solid state blends of the pellets serve equally as well as pelletized melt state blends of raw polymer granules, of granules with pellets, or of pellets of the two components since the forming process includes a remelting and mixing of the raw material. In the process of compression molding of medical devices, however, little mixing of the melt components occurs, and a pelletized melt blend would be preferred over simple solid state blends of the constituent pellets and/or granules. Those skilled in the art will be able to determine the appropriate procedure for blending of the polymers to balance the need for intimate mixing of the component ingredients with the desire for process economy.

Applications

The resultant plasticized polyolefin of the present invention may be processed by any suitable means such as by calendering, casting, coating, compounding, extrusion, foamed, laminated, blow molding, compression molding, injection molding, thermoforming, transfer molding, cast molding, rotational molding, casting such as for films, spun or melt bonded such (e.g. fiber spinning, spinbonding, melt blowing, etc.) as for fibers, or other forms of processing such as described in, for example, PLASTICS PROCESSING (Radian Corporation, Noyes Data Corp. 1986). More particularly, with respect to the physical process of producing the blend, sufficient mixing should take place to assure that a uniform blend will be produced prior to conversion into a finished product.

The compositions of this invention (and blends thereof as described above) may be used in any known thermoplastic or elastomer application. Examples include uses in molded parts, films, tapes, sheets, tubing, hose, sheeting, wire and cable coating, adhesives, shoesoles, bumpers, gaskets, bellows, films, fibers, elastic fibers, nonwovens, spunbonds, sealants, surgical gowns and medical devices.

These devices may be made or formed by any useful forming means for forming polyolefins. This will include, at least, molding including compression molding, injection molding, blow molding, and transfer molding; film blowing or casting; extrusion, and thermoforming; as well as by lamination, pultrusion, protrusion, draw reduction, rotational molding, spinbonding, melt spinning, melt blowing; or combinations thereof. Use of at least thermoforming or film applications allows for the possibility of and derivation of benefits from uniaxial or biaxial orientation of the radiation tolerant material.

Adhesives

The polymers of this invention or blends thereof can be used as adhesives, either alone or combined with tackifiers. Preferred tackifiers are described above. The tackifier is typically present at about 1 weight % to about 50 weight %, based upon the weight of the blend, more preferably 10 weight % to 40 weight %, even more preferably 20 weight % to 40 weight %. Other additives, as described above, may be added also.

The adhesives of this invention can be used in any adhesive application, including but not limited to, disposables, packaging, laminates, pressure sensitive adhesives, tapes labels, wood binding, paper binding, non-wovens, road marking, reflective coatings, and the like. In a preferred embodiment the adhesives of this invention can be used for disposable diaper and napkin chassis construction, elastic attachment in disposable goods converting, packaging, labeling, bookbinding, woodworking, and other assembly applications. Particularly preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

Films

The compositions described above and the blends thereof may be formed into monolayer or multilayer films. These films may be formed by any of the conventional techniques known in the art including extrusion, co-extrusion, extrusion coating, lamination, blowing and casting. The film may be obtained by the flat film or tubular process which may be followed by orientation in an uniaxial direction or in two mutually perpendicular directions in the plane of the film. One or more of the layers of the film may be oriented in the transverse and/or longitudinal directions to the same or different extents. This orientation may occur before or after the individual layers are brought together. For example a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15 preferably 7 to 9. However in another embodiment the film is oriented to the same extent in both the MD and TD directions.

In another embodiment the layer comprising the plasticized polyolefin composition of this invention (and/or blends thereof) may be combined with one or more other layers. The other layer(s) may be any layer typically included in multi-layer film structures. For example the other layer or layers may be:

1. Polyolefins
    Preferred polyolefins include homopolymers or copolymers of C2 to C40 olefins, preferably C2 to C20 olefins, preferably a copolymer of an alpha-olefin and another olefin or alpha-olefin (ethylene is defined to be an alpha-olefin for purposes of this invention). Preferably homopolyethylene, homopolypropylene, propylene copolymerized with ethylene and or butene, ethylene copolymerized with one or more of propylene, butene or hexene, and optional dienes. Preferred examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as for example, thermoplastic elastomers and rubber toughened plastics.
2. Polar polymers
    Preferred polar polymers include homopolymers and copolymers of esters, amides, acetates, anhydrides, copolymers of a C2 to C20 olefin, such as ethylene and/or propylene and/or butene with one or more polar monomers such as acetates, anhydrides, esters, alcohol, and or acrylics. Preferred examples include polyesters, polyamides, ethylene vinyl acetate copolymers, and polyvinyl chloride.
3. Cationic polymers Preferred cationic polymers include polymers or copolymers of geminally disubstituted olefins, alpha-heteroatom olefins and/or styrenic monomers. Preferred geminally disubstituted olefins include isobutylene, isopentene, isoheptene, isohexane, isooctene, isodecene, and isododecene. Preferred alpha-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-alpha-methyl styrene.
4. Miscellaneous
    Other preferred layers can be paper, wood, cardboard, metal, metal foils (such as aluminum foil and tin foil), metallized surfaces, glass (including silicon oxide (SiO.x) coatings applied by evaporating silicon oxide onto a film surface), fabric, spunbonded fibers, and non-wovens (particularly polypropylene spunbonded fibers or non-wovens), and substrates coated with inks, dyes, pigments, and the like.

The films may vary in thickness depending on the intended application, however films of a thickness from 1 to 250 μm are usually suitable. Films intended for packaging are usually from 10 to 60 micron thick. The thickness of the sealing layer is typically 0.2 to 50 μm. There may be a sealing layer on both the inner and outer surfaces of the film or the sealing layer may be present on only the inner or the outer surface.

Additives such as block, antiblock, antioxidants, pigments, fillers, processing aids, UV stabilizers, neutralizers, lubricants, surfactants and/or nucleating agents may also be present in one or more than one layer in the films. Preferred additives include silicon dioxide, titanium dioxide, polydimethylsiloxane, talc, dyes, wax, calcium sterate, carbon black, low molecular weight resins and glass beads.

In another embodiment one more layers may be modified by corona treatment, electron beam irradiation, gamma irradiation, or microwave irradiation. In a preferred embodiment one or both of the surface layers is modified by corona treatment.

The films described herein may also comprise from 5 to 60 weight %, based upon the weight of the polymer and the resin, of a hydrocarbon resin. The resin may be combined with the polymer of the seal layer(s) or may be combined with the polymer in the core layer(s). The resin preferably has a softening point above 100° C., even more preferably from 130 to 180° C. Preferred hydrocarbon resins include those described above. The films comprising a hydrocarbon resin may be oriented in uniaxial or biaxial directions to the same or different degrees.

Molded Products

The plasticized polyolefin composition described above may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

The compositions described herein may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. An embodiment of a thermoforming sequence is described, however this should not be construed as limiting the thermoforming methods useful with the compositions of this invention. First, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool.

Thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, the thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer such as polypropylene, fast plug speeds generally provide the best material distribution in the part.

The shaped laminate is then cooled in the mold. Sufficient cooling to maintain a mold temperature of 30° C. to 65° C. is desirable. The part is below 90° C. to 100° C. before ejection in one embodiment. For the good behavior in thermoforming, the lowest melt flow rate polymers are desirable. The shaped laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

In yet another embodiment of the formation and shaping process, profile co-extrusion can be used. The profile co-extrusion process parameters are as above for the blow molding process, except the die temperatures (dual zone top and bottom) range from 150° C.-235° C., the feed blocks are from 90° C.-250° C., and the water cooling tank temperatures are from 10° C.-40° C.

One embodiment of an injection molding process is described as follows. The shaped laminate is placed into the injection molding tool. The mold is closed and the substrate material is injected into the mold. The substrate material has a melt temperature between 200° C. and 300° C. in one embodiment, and from 215° C. and 250° C. and is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,380 kPa to 10,400 kPa. The mold is cooled between 10° C. and 70° C. to cool the substrate. The temperature will depend on the desired gloss and appearance desired. Typical cooling time is from 10 to 30 seconds, depending on part on the thickness. Finally, the mold is opened and the shaped composite article ejected.

Likewise, molded articles may be fabricated by injecting molten polymer into a mold that shapes and solidifies the molten polymer into desirable geometry and thickness of molded articles. Sheet may be made either by extruding a substantially flat profile from a die, onto a chill roll, or alternatively by calendering. Sheet will generally be considered to have a thickness of from 10 mils to 100 mils (254 μm to 2540 μm), although sheet may be substantially thicker. Tubing or pipe may be obtained by profile extrusion for uses in medical, potable water, land drainage applications or the like. The profile extrusion process involves the extrusion of molten polymer through a die. The extruded tubing or pipe is then solidified by chill water or cooling air into a continuous extruded articles. The tubing will generally be in the range of from 0.31 cm to 2.54 cm in outside diameter, and have a wall thickness of in the range of from 254 μm to 0.5 cm. The pipe will generally be in the range of from 2.54 cm to 254 cm in outside diameter, and have a wall thickness of in the range of from 0.5 cm to 15 cm. Sheet made from the products of an embodiment of a version of the present invention may be used to form containers. Such containers may be formed by thermoforming, solid phase pressure forming, stamping and other shaping techniques. Sheets may also be formed to cover floors or walls or other surfaces.

In an embodiment of the thermoforming process, the oven temperature is between 160° C. and 195° C., the time in the oven between 10 and 20 seconds, and the die temperature, typically a male die, between 10° C. and 71° C. The final thickness of the cooled (room temperature), shaped laminate is from 10 μm to 6000 μm in one embodiment, from 200 μm to 6000 μm in another embodiment, and from 250 μm to 3000 μm in yet another embodiment, and from 500 μm to 1550 μm in yet another embodiment, a desirable range being any combination of any upper thickness limit with any lower thickness limit.

In an embodiment of the injection molding process, wherein a substrate material in injection molded into a tool including the shaped laminate, the melt temperature of the substrate material is between 230° C. and 255° C. in one embodiment, and between 235° C. and 250° C. in another embodiment, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt any tie-layer material or backing layer to achieve adhesion between the layers.

In yet another embodiment of the invention, the compositions of this invention may be secured to a substrate material using a blow molding operation. Blow molding is particularly useful in such applications as for making closed articles such as fuel tanks and other fluid containers, playground equipment, outdoor furniture and small enclosed structures. In one embodiment of this process, Compositions of this invention are extruded through a multi-layer head, followed by placement of the uncooled laminate into a parison in the mold. The mold, with either male or female patterns inside, is then closed and air is blown into the mold to form the part.

It will be understood by those skilled in the art that the steps outlined above may be varied, depending upon the desired result. For example, an extruded sheet of the compositions of this invention may be directly thermoformed or blow molded without cooling, thus skipping a cooling step. Other parameters may be varied as well in order to achieve a finished composite article having desirable features.

Preferred articles made using the plasticized polyolefins of this invention include cookware, storageware, toys, medical devices, sterilizable medical devices, sterilization containers, sheets, crates, containers, packaging, wire and cable jacketing, pipes, geomembranes, sporting equipment, chair mats, tubing, profiles, instrumentation sample holders and sample windows, outdoor furniture (e.g., garden furniture) playground equipment, automotive, boat and water craft components, and other such articles. In particular, the compositions are suitable for automotive components such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

Non-Wovens and Fibers

The plasticized polyolefin composition described above may be used to prepare the nonwoven fabrics and fibers in any nonwoven fabric and fiber making process, including but not limited to, melt blowing, spunbonding, film aperturing, and staple fiber carding. A continuous filament process may also be used. Preferably a spunbonding process is used. The spunbonding process is well known in the art. Generally it involves the extrusion of fibers through a spinneret. These fibers are then drawn using high velocity air and laid on an endless belt. A calender roll is generally then used to heat the web and bond the fibers to one another although other techniques may be used such as sonic bonding and adhesive bonding.

Fiber Preparation

The formation of woven and nonwoven articles from the polyolefin/NFP blends described herein typically requires the manufacture of fibers by extrusion followed by weaving or bonding. The spinning process is typically accompanied by mechanical or aerodynamic drawing of the fibers. Essentially all fibers are oriented both during the spinning process as well as during the process of manufacture of the nonwoven article.

a. Conventional Fine Denier PP Fibers

The three more conventional PP fiber operations, continuous filament, bulked continuous filament, and staple, are useful as means for preparing fibers of the blends of the present invention. Typically the molten blend is extruded through the holes in a die (spinneret) between 0.3 mm to 0.8 mm (10 mil to 30 mil) in diameter. Low melt viscosity of the polymer blend is preferred and is typically achieved through the use of high melt temperature (230° C. to 280° C.) and high melt flow rates (15 g/10 min to 40 g/10 min). A relatively large extruder is typically equipped with a manifold to distribute a high output of molten blend to a bank of eight to twenty spinheads. Each spinhead is typically equipped with a separate gear pump to regulate output through the spinhead, normally comprising a filter pack, supported by a "breaker plate;" and the spinneret plate within the head. The number of holes in the spinneret plate determines the number of filaments in a yarn and varies considerably with the different yarn constructions, but it is typically in the range of 50 to 250. The holes are typically grouped into round, annular, or rectangular patterns to assist in good distribution of the quench air flow.

b. Continuous Filament

Continuous filament yarns typically range from 40 denier to 2,000 denier (denier=number of grams/9000 yd). Filaments typically range from 1 to 20 dpf, but can be larger. Spinning speeds are typically 800 m/min to 1500 m/min (2500 ft/min to 5000 ft/min). The filaments are drawn at draw ratios of 3:1 or more (one- or two-stage draw) and wound onto a package. Two-stage drawing allows higher draw ratios to be achieved. Winding speeds are 2,000 m/min to 5,000 n/min (6,600 ft/min to 16,400 ft/min).

c. Bulked Continuous Filament

Bulked Continuous Filament fabrication processes fall into two basic types, one-step and two step. In the older, two-step process, an undrawn yarn is spun at less than 1,000 m/min (3,300 ft/min), usually 750 m/min, and placed on a package. The yarn is drawn (usually in two stages) and "bulked" on a machine called a texturizer. Winding and drawing speeds are limited by the bulking or texturizing device to 2,500 m/min (8,200 ft/mim) or less. Typically if secondary crystallization occurs in the two-step CF process, then one typically promptly uses draw texturizing. The most common process today is the one-step spin/draw/texturizing (SDT) process. This process provides better economics, efficiency and quality than the two-step process. It is similar to the one-step CF process, except that the bulking device is in-line. Bulk or texture changes yarn appearance, separating filaments and adding enough gentle bends and folds to make the yarn appear fatter (bulkier).

d. Staple Fiber

There are two basic staple fiber fabrication processes: traditional and compact spinning. The traditional process involves two steps: 1) producing, applying finish, and winding followed by 2) drawing, a secondary finish application, crimping, and cutting into staple. Filaments can range from 1.5 dpf to >70 dpf, depending on the application. Staple length can be as short as 7 mm or as long as 200 mm (0.25 in. to 8 in.) to suit the application. For many applications the fibers are crimped. Crimping is accomplished by over-feeding the tow into a steam-heated stuffer box with a pair of nip rolls. The over-feed folds the tow in the box, forming bends or crimps in the filaments. These bends are heat-set by steam injected into the box.

e. Melt-Blown Fibers

Melt blown fibers can make very fine filaments and produce very lightweight fabrics with excellent uniformity. The result is often a soft fabric with excellent "barrier" properties. In the melt blown process molten polymer moves from the extruder to the special melt blowing die. As the molten filaments exit the die, they are contacted by high temperature, high velocity air (called process or primary air). This air rapidly draws and, in combination with the quench air, solidifies the filaments. The entire fiber forming process generally takes place within 7 mm (0.25 in.) from the spinnerets. The fabric is formed by blowing the filaments directly onto a forming wire, 200 mm to 400 mm (8 in. to 15 in.) from the spinnerets.

Melt blown microfibers useful in the present invention can be prepared as described in Van A. Wente, "Superfine Thermoplastic Fibers," Industrial Engineering Chemistry, vol. 48, pp. 1342-1346 and in Report No. 4364 of the Naval Research Laboratories, published May 25, 1954, entitled "Manufacture of Super Fine Organic Fibers" by Van A. Wente et al. In some preferred embodiments, the microfibers are used in filters. Such blown microfibers typically have an effective fiber diameter of from about 3 to 30 micrometers preferably from about 7 to 15 micrometers, as calculated according to the method set forth in Davies, C. N., "The Separation of Airborne Dust and Particles," Institution of Mechanical Engineers, London, Proceedings 1B, 1952.

f. Spunbonded Fibers

Fiber formation may also be accomplished by extrusion of the molten polymer from either a large spinneret having several thousand holes or with banks of smaller spinnerets containing as few as 40 holes. After exiting the spinneret, the molten fibers are quenched by a cross-flow air quench system, then pulled away from the spinneret and attenuated (drawn) by high pressure air. There are two methods of air attenuation, both of which use the venturi effect. The first draws the filament using an aspirator slot (slot draw), which runs the width of the machine. The second method draws the filaments through a nozzle or aspirator gun. Filaments formed in this manner are collected on a screen ("wire") or porous forming belt to form the fabric. The fabric is then passed through compression rolls and then between heated calender rolls where the raised lands on one roll bond the fabric at points covering 20% to 40% of its area.

Annealing

In additional embodiments, the mechanical properties of fibers comprising the blends of this invention can be improved by the annealing the fibers or the non-woven materials made from the blends of this invention. Annealing is often combined with mechanical orientation, although annealing is preferred. Annealing partially relieves the internal stress in the stretched fiber and restores the elastic recovery properties of the blend in the fiber. Annealing has been shown to lead to significant changes in the internal organization of the crystalline structure and the relative ordering of the amorphous and semicrystalline phases. Annealing typically leads to improved elastic properties. The fiber or fabric is preferably annealed at a temperature of at least 40° F., preferably at least 20° F. above room temperature (but slightly below the crystalline melting point of the blend). Thermal annealing of the blend is conducted by maintaining the polymer blends or the articles made from a such a blend at temperature between room temperature to a maximum of 160° C. or more preferably to a maximum of 130° C. for a period between 5 minutes to less than 7 days. A typical annealing period is 3 days at 50° C. or 5 minutes at 100° C. While the annealing is done in the absence of mechanical orientation, the latter can be a part of the annealing process on the fiber (past the extrusion operation). Mechanical orientation can be done by the temporary, forced extension of the fiber for a short period of time before it is allowed to relax in the absence of the extensional forces. Oriented fibers are conducted by maintaining the fibers or the articles made from a blend at an extension of 100% to 700% for a period of 0.1 seconds to 24 hours. A typical orientation is an extension of 200% for a momentary period at room temperature.

For orientation, a fiber at an elevated temperature (but below the crystalline melting point of the polymer) is passed from a feed roll of fiber around two rollers driven at different surface speeds and finally to a take-up roller. The driven roller closest to the take-up roll is driven faster than the driven roller closest to the feed roll, such that the fiber is stretched between the driven rollers. The assembly may include a roller intermediate the second roller and take-up roller to cool the fiber. The second roller and the take-up roller may be driven at the same peripheral speeds to maintain the fiber in the stretched condition. If supplementary cooling is not used, the fiber will cool to ambient temperature on the take up roll.

For more information on fiber and non-woven production please see Polypropylene Handbook, E. P. Moore, Jr., et al., Hanser/Gardner Publications, Inc. New York, 1996, pages 314 to 322, which is incorporated by reference herein for US patent practice.

Nonwoven Web

In a preferred embodiment, a nonwoven fiber web is prepared from the polyolefin/NFP/slip additive blends of the invention. The fibers employed in such a web typically and preferably have denier ranging from about 0.5 to about 10 (about 0.06 to about 1.1 tex), although higher denier fibers may also be employed. Fibers having denier from about 0.5 to 3 (0.06 to about 0.33 tex) are particularly preferred. ("Denier" means weight in grams of 9000 meters of fiber, whereas "tex" means weight in grams per kilometer of fiber.) Fiber stock having a length ranging from about 0.5 to about 10 cm is preferably employed as a starting material, particularly fiber lengths ranging from about 3 to about 8 cm. Nonwoven webs of fibers may be made using methods well documented in the nonwoven literature (see for example Turbak, A. "Nonwovens: An Advanced Tutorial", Tappi Press, Atlanta, Ga., (1989). The uncoated (i.e., before application of any binder) web should have a thickness in the range of about 10 to 100 mils (0.254 to 2.54 mm), preferably 30 to 70 mils (0.762 to 1.778 mm), more preferably 40 to 60 mils (1.02 to 1.524 mm). These preferred thicknesses may be achieved either by the carding/crosslapping operation or via fiber entanglement (e.g., hydroentanglement, needling, and the like). The basis weight of the uncoated web preferably ranges from about 15 $g/m^2$ up to about 250 $g/m^2$. In some embodiments, one may improve the tensile and tear strength of the inventive articles, and reduce lint on the surface of the articles, by entangling (such as by needletacking, hydroentanglement, and the like) the nonwoven web, or calendering the uncoated and/or coated and cured nonwoven web. Hydroentanglement may be employed in cases where fibers are water insoluble. Calendering of the nonwoven web at temperatures from about 5 to about 40° C. below the melting point of the fiber may reduce the likelihood of lint attaching to the surface of the ultimate articles and provide a smooth surface. Embossing of a textured pattern onto the nonwoven web may be performed simultaneously with calendering, or in a subsequent step.

In addition to the polyolefins, slip additives and the NFP's of this invention, it may also be desirable to add colorants (especially pigments), softeners (such as ethers and alcohols), fragrances, fillers (such as for example silica, alumina, and titanium dioxide particles), and bactericidal agents (for example iodine, quaternary ammonium salts, and the like) to the blends.

Likewise the nonwoven webs and fibers may be coated with other materials, such as binders, adhesives, reflectants, and the like. Coating of the nonwoven web or the fiber may be accomplished by methods known in the art, including roll coating, spray coating, immersion coating, gravure coating, or transfer coating. The coating weight as a percentage of the total wiping article may be from about 1% to about 95%, preferably from about 10% to about 60%, more preferably 20 to 40%.

Staple fibers may also be present in the nonwoven web. The presence of staple fibers generally provides a more lofty, less dense web than a web of only blown microfibers. Preferably, no more than about 90 weight percent staple fibers are present, more preferably no more than about 70 weight percent. Such webs containing staple fiber are disclosed in U.S. Pat. No. 4,118,531 (Hauser) which is incorporated herein by reference.

Sorbent particulate material such as activated carbon or alumina may also be included in the web. Such particles may be present in amounts up to about 80 volume percent of the contents of the web. Such particle-loaded webs are described, for example, in U.S. Pat. No. 3,971,373 (Braun), U.S. Pat. No. 4,100,324 (Anderson) and U.S. Pat. No. 4,429,001 (Kolpin et al.), which are incorporated herein by reference.

The fibers and nonwoven webs prepared using the blends of this invention can be formed into fabrics, garments, clothing, medical garments, surgical gowns, surgical drapes, diapers, training pants, sanitary napkins, panty liners, incontinent wear, bed pads, bags, packaging material, packages, swimwear, body fluid impermeable backsheets, body fluid impermeable layers, body fluid permeable layers, body fluid permeable covers, absorbents, tissues, nonwoven composites, liners, cloth linings, scrubbing pads, face masks, respirators, air filters, vacuum bags, oil and chemical spill sorbents, thermal insulation, first aid dressings, medical wraps, fiberfill, outerwear, bed quilt stuffing, furniture padding, filter media, scrubbing pads, wipe materials, hosiery, automotive seats, upholstered furniture, carpets, carpet backing, filter media, disposable wipes, diaper coverstock, gardening fabric, geomembranes, geotextiles, sacks, housewrap, vapor barriers, breathable clothing, envelopes, tamper evident fabrics, protective packaging, and coasters.

The fibers prepared using the blends of this invention can be formed into yarns, woven fabrics, nonwoven fabrics, hook and loop fasteners, fabrics, garments, clothing, medical garments, surgical gowns, surgical drapes, diapers, training pants, sanitary napkins, panty liners, incontinent wear, bed pads, bags, packaging material, packages, swimwear, body fluid impermeable backsheets, body fluid impermeable layers, body fluid permeable layers, body fluid permeable covers, absorbents, tissues, nonwoven composites, liners, cloth linings, scrubbing pads, face masks, respirators, air filters, vacuum bags, oil and chemical spill sorbents, thermal insulation, first aid dressings, medical wraps, fiberfill, outerwear, bed quilt stuffing, furniture padding, filter media, scrubbing pads, wipe materials, hosiery, automotive seats, upholstered furniture, carpets, carpet backing, filter media, disposable wipes, diaper coverstock, gardening fabric, geomembranes, geotextiles, sacks, housewrap, vapor barriers, breathable clothing, envelops, tamper evident fabrics, protective packaging, and coasters.

Test Methods

Dynamic Mechanical Thermal Analysis

The glass transition temperature ($T_g$) and storage modulus (E') were measured using dynamic mechanical thermal analysis (DMTA). This test provides information about the small-strain mechanical response (relaxation behavior) of a sample as a function of temperature over a temperature range that includes the glass transition region and the visco-elastic region prior to melting.

Typically, samples were tested using a three point bending configuration (TA Instruments DMA 2980). A solid rectangular compression molded bar was placed on two fixed supports; a movable clamp applied a periodic deformation to the sample midpoint at a frequency of 1 Hz and an amplitude of 20 µm. The sample was initially cooled to −130° C. then heated to 60° C. at a heating rate of 3° C./min. In some cases, compression molded bars were tested using other deformation configurations, namely dual cantilever bending and tensile elongation (Rheometrics RSAII). The periodic deformation under these configurations was applied at a frequency of 1 Hz and strain amplitude of 0.05%. The sample was cooled to −130° C. and then heated to 60° C. at a rate of 2° C./min. The slightly difference in heating rate does not influence the glass transition temperature measurements significantly.

The output of these DMTA experiments is the storage modulus (E') and loss modulus (E"). The storage modulus measures the elastic response or the ability of the material to store energy, and the loss modulus measures the viscous response or the ability of the material to dissipate energy. Tan δ is the ratio of E"/E' and gives a measure of the damping ability of the material. The beginning of the broad glass transition (β-relaxation) is identified as the extrapolated tangent to the Tan δ peak. In addition, the peak temperature and area under the peak are also measured to more fully characterize the transition from glassy to visco-elastic region.

Differential Scanning Calorimetry

Crystallization temperature ($T_c$) and melting temperature ($T_m$) were measured using Differential Scanning calorimetry (DSC). This analysis was conducted using either a TA Instruments MDSC 2920 or a Perkin Elmer DSC7. Typically, 6 to 10 mg of molded polymer or plasticized polymer was sealed in an aluminum pan and loaded into the instrument at room temperature. Melting data (first heat) were acquired by heating the sample to at least 30° C. above its melting temperature at a heating rate of 10° C./min. This provides information on the melting behavior under as-molded conditions, which can be influenced by thermal history as well as any molded-in orientation or stresses. The sample was then held for 10 minutes at this temperature to destroy its thermal history. Crystallization data was acquired by cooling the sample from the melt to at least 50° C. below the crystallization temperature at a cooling rate of 10° C./min. The sample was then held at 25° C. for 10 minutes, and finally heated at 10° C./min to acquire additional melting data (second heat). This provides information about the melting behavior after a controlled thermal history and free from potential molded-in orientation and stress effects. The endothermic melting transition (first and second heat) and exothermic crystallization transition were analyzed for onset of transition and peak temperature. The melting temperatures reported in the tables are the peak melting temperatures from the second heat unless otherwise indicated. For polymers displaying multiple peaks, the higher melting peak temperature is reported.

Areas under the curve was used to determine the heat of fusion ($\Delta H_f$) which can be used to calculate the degree of crystallinity. A value of 207 J/g was used as the equilibrium heat of fusion for 100% crystalline polypropylene (obtained from B. Wunderlich, "Thermal Analysis", Academic Press, Page 418, 1990). The percent crystallinity is calculated using the formula, [area under the curve (J/g)/207 (J/g)]*100.

Size-Exclusion Chromatography of Polymers

Molecular weight distribution was characterized using Size-Exclusion Chromatography (SEC). Molecular weight (weight-average molecular weight, Mw, and number-average molecular weight, Mn) were determined using a High Temperature Size Exclusion Chromatograph (either from Waters Corporation or Polymer Laboratories), equipped with a differential refractive index detector (DRI), an online light scattering detector, and a viscometer. Experimental details not described below, including how the detectors were calibrated, are described in: T. Sun, P. Brant, R. R. Chance, and W. W. Graessley, Macromolecules, Volume 34, Number 19, 6812-6820, (2001).

Three Polymer Laboratories PLgel 10 mm Mixed-B columns were used. The nominal flow rate was 0.5 cm$^3$/min, and the nominal injection volume was 300 µL. The various transfer lines, columns and differential refractometer (the DRI detector) were contained in an oven maintained at 135° C.

Solvent for the SEC experiment was prepared by dissolving 6 grams of butylated hydroxy toluene as an antioxidant in 4 liters of Aldrich reagent grade 1,2,4 trichlorobenzene (TCB). The TCB mixture was then filtered through a 0.7 µm glass pre-filter and subsequently through a 0.1 µm Teflon filter. The TCB was then degassed with an online degasser before entering the SEC.

Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units are 1.463 g/ml at room temperature and 1.324 g/ml at 135° C. The injection concentration ranged from 1.0 to 2.0 mg/ml, with lower concentrations being used for higher molecular weight samples.

Prior to running each sample the DRI detector and the injector were purged. Flow rate in the apparatus was then increased to 0.5 ml/minute, and the DRI was allowed to stabilize for 8-9 hours before injecting the first sample. The LS laser was turned on 1 to 1.5 hours before running samples.

The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the same as described below for the LS analysis. Units on parameters throughout this description of the SEC method are such that concentration is expressed in g/cm³, molecular weight is expressed in g/mole, and intrinsic viscosity is expressed in dL/g.

The light scattering detector used was a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_c c$$

Here, $\Delta R(\theta)$ is the measured excess Rayleigh scattering intensity at scattering angle θ, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_o = \frac{4\pi^2 n^2 \left(\frac{dn}{dc}\right)^2}{\lambda^4 N_A}$$

in which $N_A$ is Avogadro's number, and (dn/dc) is the refractive index increment for the system. The refractive index, n=1.500 for TCB at 135° C. and X=690 nm. In addition, $A_2$=0.0006 for propylene polymers and 0.0015 for butene polymers, and (dn/dc)=0.104 for propylene polymers and 0.098 for butene polymers.

A high temperature Viscotek Corporation viscometer was used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c was determined from the DRI output.

The branching index (g') is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromotographic slices, i, between the integration limits. The branching index g' is defined as:

$$g' = \frac{[\eta]_{avg}}{k M_v^\alpha}$$

where k=0.0002288 and α=0.705 for propylene polymers, and k=0.00018 and α=0.7 for butene polymers. $M_v$ is the viscosity-average molecular weight based on molecular weights determined by LS analysis.

¹³C-NMR Spectroscopy

Polymer microstructure was determined by ¹³C-NMR spectroscopy, including the concentration of isotactic and syndiotactic diads ([m] and [r]), triads ([mm] and [rr]), and pentads ([mmmm] and [rrrr]). Samples were dissolved in $d_2$-1,1,2,2-tetrachloroethane. Spectra were recorded at 125° C. using a NMR spectrometer of 75 or 100 MHz. Polymer resonance peaks are referenced to mmmm=21.8 ppm. Calculations involved in the characterization of polymers by NMR follow the work of F. A. Bovey in "Polymer Conformation and Configuration" Academic Press, New York 1969 and J. Randall in "Polymer Sequence Determination, ¹³C-NMR Method", Academic Press, New York, 1977. The percent of methylene sequences of two in length, % $(CH_2)_2$, were calculated as follows: the integral of the methyl carbons between 14-18 ppm (which are equivalent in concentration to the number of methylenes in sequences of two in length) divided by the sum of the integral of the methylene sequences of one in length between 45-49 ppm and the integral of the methyl carbons between 14-18 ppm, times 100. This is a minimum calculation for the amount of methylene groups contained in a sequence of two or more since methylene sequences of greater than two have been excluded. Assignments were based on H. N. Cheng and J. A. Ewen, Makromol. Chem. 1989, 190, 1931.

Viscosity of Polymers and Blends

The shear viscosity as a function of shear rate was determined using a dual-barrel capillary rheometer. The capillary rheometer (Rosand Model RAH7/2 by Bohun Instruments) was equipped with a 30:1 length to diameter ratio capillary. A total mass of 25-30 g of pellets were packed into the capillary barrels and preheated at 230° C. for 10 minutes to remove any entrained air before the test. Each test was performed at 230° C. over the shear rate range of from 30 to 3000 s⁻¹. Corrections to the data for entrance pressure losses (i.e., the Bagley correction) were performed online via simultaneous pressure loss measurements for the flow of the material through an orifice that was installed into the second barrel of the rheometer.

The dynamic shear viscosity as a function of frequency was determined by small-amplitude oscillatory shear rheology. A Rheometrics Scientific DSR-500 dynamic stress-controlled rheometer with a cone and plate sample fixture was used. Testing was performed at 190° C. Samples were subjected to an oscillatory shear stress at a nominal amplitude of 100 Pa by oscillating the upper cone at a fixed frequency, and the resultant strain was measured. The auto-stress adjustment capability was utilized to keep the strain within limits of 1-30% (stress adjustment setting=32% of current stress, maximum stress=100 Pa). These conditions ensure that each material was characterized within its linear viscoelastic region. The dynamic shear viscosity was calculated from the measured strain and applied stress as a function of frequency. Frequency sweeps were conducted starting at 500 rad/s and decreasing to 0.02 rad/s, using a logarithmic sweep mode with 6 points per decade.

The dynamic shear viscosity (η*) versus frequency (ω) curves were fitted using the Cross model (as described in C. W. Macoskco, "Rheology: Principles, Measurements, and Applications", Wiley-VCH, 1994):

$$\eta^* = \frac{\eta_0}{1 + (\lambda\omega)^{1-n}}$$

The three parameters in this model are: $\eta_0$, the zero-shear viscosity; $\lambda$, the average relaxation time; and n, the power law exponent. The zero-shear viscosity is the value at a plateau in the Newtonian region of the flow curve at a low frequency, where the dynamic shear viscosity is independent of frequency. The average relaxation time corresponds to the inverse of the frequency at which shear-thinning starts. The power law exponent n is the slope of the shear thinning region at high shear rates in a log-log plot of dynamic shear viscosity versus frequency. These parameters provide a means to compare the effect of plasticization on a material's flow behavior, sensitivity to shear, and molecular structure.

Melt Flow Rate

Melt Flow Rate (MFR) is measured according to ASTM D1238 at 230° C. under a load of 2.16 kg unless otherwise noted. Melt Index (MI) is measured according to ASTM D 1238 at 190° C. under a load of 2.16 kg. The units for MFR and MI are g/10 min, or dg/min.

Polymer Density

Density is measured by density-gradient column, such as described in ASTM D1505, on a compression-molded specimen that has been slowly cooled to room temperature.

Fabric and Film Properties

Flexure and tensile properties (including 1% Secant Flexure Modulus, Peak Load, Tensile Strength at Break, and Elongation at Break) are determined by ASTM D 882. Elmendorf tear is determined by ASTM D 1922. Puncture and puncture energy are determined by ASTM D 3420. Total energy dart impact is determined by ASTM D 4272

Softness or "hand" of spunbond nonwoven fabric as it is known in the art was measured using the Thwing-Albert Handle-O-Meter (Model 211-10-B/America.) The quality of "hand" is considered to be the combination of resistance due to the surface friction and flexibility of a fabric material. The Handle-O-Meter measures the above two factors using and LVDT (Linear Variable Differential Transformer) to detect the resistance that a blade encounters when forcing a specimen of material into a slot of parallel edges. A 3 digit digital voltmeter (DVM) indicates the resistance directly in grams. The "total hand" of any given sheet of material is the average of four readings taken on both sides and both directions of a test sample and is recorded in grams per standard width of sample material. A decrease in "total hand" indicates the improvement of fabric softness.

Fluid Properties

Pour Point is measured by ASTM D 97. Kinematic Viscosity (KV) is measured by ASTM D 445. Specific gravity is typically determined by ASTM D 4052, at the temperature specified. Viscosity index (VI) is determined by ASTM D 2270. Boiling point and distillation range are typically determined by ASTM D 86 or ASTM D 1160. Saturates and aromatics content can be determined by various methods, such as ASTM D 3238.

The number-average molecular weight (Mn) can be determined by Gas Chromatography (GC), as described in "Modern Practice of Gas Chromatography", R. L. Grob and E. F. Barry, Wiley-Interscience, 3rd Edition (July 1995); or determined by Gel Permeation Chromatography (GPC), as described in "Modern Size Exclusion Liquid Chromatographs", W. W. Yan, J. J. Kirkland, and D. D. Bly, J. Wiley & Sons (1979); or estimated by ASTM D 2502; or estimated by freezing point depression, as described in "Lange's Handbook of Chemistry", 15th Edition, McGrawHill. The average carbon number (Cn) is calculated from Mn by Cn=(Mn−2)/14.

Processing Methods

Blending

The components of the present invention can be blended by any suitable means. For example, they may be blended in a static mixer, batch mixer, extruder, or a combination thereof, that is sufficient to achieve an adequate dispersion of plasticizer in the polymer. The mixing step may involve first dry blending using, for example, a tumble blender. It may also involve a "master batch" approach, where the final plasticizer concentration is achieved by combining neat polymer with an appropriate amount of NFP- and/or slip additive-containing polymer that had been previously prepared at a higher NFP/slip additive concentrations. Dispersion may take place as part of a processing method used to fabricate articles, such as in the extruder on a fiber line. The plasticizer and/or slip additive may be injected into the extruder barrel or introduced at the feed throat of the extruder to save the step of preblending. This is a preferred method when a larger percentage of plasticizer is to be used or large quantities of plasticized resin are desired.

Two general methods were used to generate examples of plasticized blends. The first method, which is referred to as the Extruder Method, involved first "dry blending" reactor granules of the polymer with appropriate amounts of plasticizer and an additive package (including such components as antioxidants and nucleating agents) in a tumble blender to achieve a homogeneous mixing of components at the desired plasticizer and additive concentrations. This was followed by compounding and pelletizing the blend using an extruder (either a 30 or 57 mm twin screw extruder) at an appropriate extrusion temperature above the melting point of the polymer, but always in the range of 200-230° C. In some cases, a sample of desired plasticizer concentration was produced by adding neat polymer pellets to plasticized polymer pellets that had been blended previously at a higher plasticizer concentration.

The second method, which is referred to as the Brabender Method, involved mixing polymer pellets with the plasticizer in a heated C. W. Brabender Instruments Plasticorder to achieve a homogeneous melt at the desired plasticizer concentration. The Brabender was equipped with a Prep-Mixer head (approximately 200 cm$^3$ volume) and roller blades. The operating temperature was above the melting point of the polymer, but always in the range of 180-190° C. Polymer was first melted in the Brabender for 1 minute at 60 RPM. Plasticizer was then added slowly to prevent pooling in the melted polymer. The blend was then mixed for 5 minutes at 60 RPM under a nitrogen purge. The Brabender was opened and the melt removed from the mixing head and blades as quickly as possible, and allowed to solidify. For those blends later subjected to injection molding, the pieces of material from the Brabender were cut into smaller pieces using a guillotine, then ground into even smaller pieces using a Wiley Mill.

Injection Molding

For materials blended using the Extruder Method, standard ASTM tensile and HDT bars, and Gardner impact discs, were molded using 120 ton injection molding equipment according to ASTM D4101. For materials blended using the Brabender Method, tensile and flexure bars were molded using 20 ton injection molding equipment according to ASTM D4101, except for the following provisions: the mold temperature was 40° C.; the inject time was 30 sec; the tensile and flex bars were of ASTM D638 Type IV and ASTM D790 geometries, respectively; and the melt temperature was, in some cases, 10° C. off from the ASTM D4101-specified value, but always in the range of 190-200° C. (except for the polybutene blends, which were molded with a melt temperature in the range of 220-230° C.).

Compression Molding

Material to be molded was placed between two sheets of PTFE-coated aluminum foil onto a 0.125 inch thick chase, and pressed in a Carver press at 160° C. The material was allowed to melt for 5 minutes without pressure applied, then compressed for 5 minutes at 10 tons pressure. It was then removed and immediately placed between water-cooled cold platens and pressed for another 5 minutes at 10 tons pressure. The foil-sample-foil assembly was allowed to anneal for at least 40 hours at room temperature, then quenched in dry ice prior to removing the sample from the foil to prevent deformation of the material when peeling off the foil. Tensile and flexure specimens were died out of the sample once it warmed to room temperature.

Spunbond Fabric Process

A typical spunbond process consists of a continuous filament extrusion, followed by drawing, web formation by the use of some type of ejector, and bonding the web. The polymer pellets are first fed into an extruder. In the extruder, the pellets simultaneously are melted and forced through the system by a heating melting screw. At the end of the screw, a spinning pump meters the molten polymer through a filter to a spinneret where the molten polymer is extruded under pressure through capillaries at a certain throughput rate (grams per hole per minute). The spinneret contains a few hundred capillaries, measuring 0.4 mm in diameter. The polymer is melted at about 30-50° C. above its melting point to achieve sufficiently low melt viscosity for extrusion. The fibers exiting the spinneret are quenched and drawn into fine fibers measuring about 16 microns in diameter. The solidified fiber is laid randomly on a moving belt to form a random netlike structure known in the art as web. Different basis weight (grams per square meter) of web is obtained by controlling the belt moving speed. After web formation, the web is bonded to achieve its final strength using a heated textile calender known in the art as thermobond calender. The calender consists of two heated steel rolls; one roll is plain and the other bears a pattern of raised points. The web is conveyed to the calender wherein a fabric is formed by pressing the web between the rolls at a bonding temperature of about 138° C.

Cast Film Process

Cast films were prepared using the following operations. Cast monolayer films were fabricated on a Killion cast film line. This line has three 24:1 L/D 2.54 cm diameter extruder, which feed polymer into a feedblock. The feedblock diverts molten polymer from the extruder to a 20.32 cm wide Cloeren die. Molten polymer exits the die at a temperature of 230° C. and is cast on a chill roll (20.3 cm diameter, 25.4 cm roll face) at 21° C. The casting unit is equipped with adjustable winding speeds to obtain film of the targeted thickness.

Methods for Determining NFP Content in Blend

Extraction

One method to determine the amount of NFP in a blend is Soxhlet extraction, wherein at least a majority of the NFP is extracted with refluxing n-heptane. Analysis of the base polymer is also required because it may contain low molecular weight and/or amorphous material that is soluble in refluxing n-heptane. The level of plasticizer in the blend is determined by correcting its extractables level, in weight percent, by the extractables level for the base polymer, as described below.

The Soxhlet extraction apparatus consists of a 400 ml Soxhlet extractor, with a widened overflow tube (to prevent siphoning and to provide constant flow extraction); a metal screen cage fitted inside the main Soxhlet chamber; a Soxhlet extraction thimble (Whatman, single thickness, cellulose) placed inside the screen cage; a condenser with cooling water and drain; and a one-neck 1000 ml round bottom flask with appropriately sized stir bar and heating mantle.

The procedure is as follows. Dry the soxhlet thimbles in a 95° C. oven for ~60 minutes. Weigh the dry thimble directly after removal from oven; record this weight as A: Thimble Weight Before, in g. Weigh out 15-20 grams of sample (either in pellet or ground pellet form) into the thimble; record as B: Polymer Weight, in g. Place the thimble containing the polymer in the Soxhlet apparatus. Pour about 300 ml of HPLC-grade n-heptane into the round bottom flask with stir bar and secure the flask on the heating mantle. Connect the round bottom flask, the soxhlet, and the condenser in series. Pour more n-heptane down through the center of the condenser into the Soxhlet main chamber until the solvent level is just below the top of the overflow tube. Turn on the cooling water to the condenser. Turn on the heating mantle and adjust the setting to generate a rolling boil in the round bottom flask and maintain a good reflux. Allow to reflux for 16 hours. Turn the heat off but leave the cooling system on. Allow the system to cool down to room temperature. Disassemble the apparatus. Remove the thimble and rinse with a small amount of fresh n-heptane. Allow to air dry in the laboratory hood, followed by oven drying at 95° C. for 90 minutes. Weigh the thimble containing the polymer directly after removal from oven; record as C: Polymer/Thimble Weight After, in g.

The quantity of extract is determined by calculating the weight loss from the sample, $W=(A+B-C)$, in g. The extractables level, E, in weight percent, is then calculated by $E=100$ (W/B). The plasticizer content in the blend, P, in weight percent, is calculated by $P=E(blend)-E(base\ polymer)$.

EXAMPLES

The present invention, while not meant to be limited by, may be better understood by reference to the following examples and tables.

Blends of mPP and fluids were prepared by melt-mixing in a single-screw compounding extruder (Extruder Method). 25 gsm (grams per square meter) basis weight spunbond fabrics were obtained at a pilot spunbond line at throughput of 0.4 grams per hole per minute (ghm). The fluids demonstrate the ability to provide substantial softness improvement in spunbond nonwoven fabrics, as provided by the lower handle-o-meter measurements in Table 5. The plasticized polyolefins can provide an improvement in handle-o-meter measurements, but also maintain the necessary tensile strength, tear resistance and fabric uniformity.

Other blends of znPP, mPP and fluids were prepared by melt-mixing in a single-screw compounding extruder (Extruder Method). 34 gsm basis weight fabrics were produced at different throughputs and their softness measured using a handle-o-meter. The handle-o-meter measurements are summarized in Tables 6 and 7. Significant increase in softness or drop in handle-o-meter measurements is observed for all fabrics made of plasticized resins. Furthermore, softness increases with increasing fluid concentration. High molecular weight PAO is generally less efficient in increasing softness than low molecular weight PAO. Emission loss of PAO during fabrication, addressed using CRySTAF, is minor as presented in Table 8.

Further condrapability improvements are observed in the examples in Tables 9-11. The spunbond fabrics were prepared from neat polypropylene, polypropylene plasticized with 5 wt. % polyalphaolefin (SHF-101) and plasticized polypropylene blended with both the polyalphaolefin and 0.2 wt. % oleamide slip agent. The blends were prepared using a single screw extruder as described above. Spunbond fabrics were produced on a spunbond line as described above at throughputs of 0.2, 0.3 and 0.4 ghm. The softness of the fabrics was measured using a handle-o-meter. Comparisons of condrapability between the neat resin, the plasticized resin, and the resins melt blended with both plasticizer and slip agent, and their spinning conditions, are shown in Tables 9-11. Further improvement in condrapability is observed for all fabrics made of blends comprising polyalphaolefin and slip agent. The combination of polyalphaolefin and slip agent creates a synergistic effect on maximizing the softness of nonwoven by the ease of bending and reduction of surface friction.

TABLE 2

List of Commercial Polymers used in Examples

| Polymer | Description* | Source |
|---|---|---|
| RCP-1 | Propylene random copolymer produced using a Ziegler-Natta catalyst having a melt flow rate (230° C., 2.16 kg) of about 35 dg/min, a density of about 0.9 g/cc, an Mw/Mn of about 2.8, and a melting point of about 143°C. | PP 9355, ExxonMobil Chemical, Houston Texas |
| -mPP-2 | Experimental isotactic polypropylene produced using a metallocene catalyst (dimethylsilyl bis (2-methyl-, 4-phenylindenyl) zirconium dimethyl with (dimethylaniliniumtetrakis(pentafluorophenyl) borate) at 80° C. in a liquid propylene slurry having an MFR of about 90 dg/min, a peak melting point of about 152° C.; an Mw/Mn of less than 2.3; and 1000 ppm Irgnox 2215 | |
| znPP-1 | Homopolypropylene produced using a Ziegler-Natta Catalyst system having a reported MFR of 36 g/10 min, a reported density of 0.9 g/cc and a reported Mw/Mn of 2.8, and a melting point of about 161° C. | PP 3155, ExxonMobil Chemical, Houston, Texas |
| mPP-1 | Isotactic polypropylene produced using a metallocene catalyst at about 80° C. in a liquid propylene slurry having an MFR of about 24 dg/min, a peak melting point of about 149° C. | Achieve ™ 3854, ExxonMobil Chemical |

TABLE 3

List of Fluids used as Plasticizers in Examples

| Fluid | Description | Source |
|---|---|---|
| SHF-101 | PAO liquid (also SpectraSyn ™ 10) | ExxonMobil Chemical |
| SHF-403 | PAO liquid (also SpectraSyn ™ 40) | ExxonMobil Chemical |
| SHF-1003 | PAO liquid (also SpectraSyn ™ 100) | ExxonMobil Chemical |
| SuperSyn 2150 | PAO liquid (also SpectraSyn Ultra ™ 150) | ExxonMobil Chemical |
| Isopar V | isoparaffinic hydrocarbon fluid | ExxonMobil Chemical |

TABLE 4

Properties of PAO Fluids used as Plasticizers in Examples

| Fluid | KV, 40° C. (cSt) | KV, 100° C. (cSt) | VI (—) | pour point (° C.) | Mn (g/mole) | Cn | specific gravity |
|---|---|---|---|---|---|---|---|
| SHF-101 | 66 | 10 | 137 | −48 | 720[#] | 51 | 0.835 |
| SHF-403 | 396 | 39 | 147 | −36 | 1,700[+] | 120 | 0.850 |
| SHF-1003 | 1240 | 100 | 170 | −30 | 3,000[+] | 210 | 0.853 |
| SuperSyn 2150 | 1,500 | 150 | 218 | −33 | 3,700[+] | 260 | 0.850 |
| Isopar V | 9 | <2 | N.D. | −63 | 240[#] | 17 | 0.82 |

N.D. = not defined, due to KV at 100° C. < 2 cSt. Mn reported by manufacturer or estimated according to ASTM D2502, except as indicated:
*estimated by freezing point depression,
[#]measured by GC,
[+]measured by GPC.
Specific gravity at 60° F. (15.6° C.) except [a] at 25° C. or [b] at 20° C.

TABLE 5

Softness of 25 gsm spunbond fabrics made of plasticized mPP-1

| | none | Isopar V | SHF-101 | SHF-403 | SuperSyn 2150 |
|---|---|---|---|---|---|
| Concentration of fluid (%) | 0 | 4 | 4 | 4 | 4 |
| Fabric Properties | | | | | |
| Peak Load (lbs) MD/TD | 9.4/4.8 | 8.0/4.4 | 7.8/4.1 | 8.3/4.1 | 7.5/3.9 |
| Elongation @ Break (%) MD/TD | 76/77 | 65/76 | 58/67 | 72/73 | 64/73 |
| Elmendorf Tear (g/basis weight) TD | 17 | 19 | 15 | 18 | 20 |
| Total Hand (grams) | 31 | 32 | 24 | 21 | 15 |

TABLE 6

Softness of 34 gsm spunbond fabrics made of plasticized znPP-1

| | Neat | SHF-101 | SHF-101 | SHF-403 | SHF-1003 |
|---|---|---|---|---|---|
| Concentration of fluid (%) | 0 | 3 | 5 | 5 | 5 |
| Softness Total Hand (grams) | | | | | |
| 0.2 gram/hole/minute | 42.5 | 31.0 | 24.7 | 24.4 | 28.8 |
| 0.3 gram/hole/minute | 49.8 | 33.4 | 28.9 | 28.5 | 29.6 |
| 0.4 gram/hole/minute | 41.4 | 32.9 | 27.4 | 28.7 | 32.0 |

TABLE 7

Softness of 34 gsm spunbond fabrics made of plasticized mPP-1

|  | Neat | SHF-101 | SHF-101 | SHF-1003 |
|---|---|---|---|---|
| Concentration of fluid (%) | 0 | 3 | 5 | 5 |
| Softness Total Hand (grams) | | | | |
| 0.2 gram/hole/minute | 58.2 | 39.9 | 32.7 | 34.6 |
| 0.3 gram/hole/minute | 49.4 | 42.7 | 38.8 | 36.7 |
| 0.4 gram/hole/minute | 53.2 | 38.4 | 30.3 | 34.3 |

TABLE 8

Fluid concentration before and after fabrication of 34 gsm spunbond fabrics made of plasticized znPP-1

|  | SHF-101 | SHF-403 | SHF-1003 |
|---|---|---|---|
| Concentration of fluid (wt %) | 5 | 5 | 5 |
| Pellet | 4.6 | 4.7 | 5.5 |
| Fabric * | 4.2 | 4.5 | 5.5 |
| Fluid Retention (%)** | 91 | 96 | 100 |

* Fabrication condition: 20 grams/m$^2$, 0.2 grams per hole per minute
**Fluid Retention = 100 − (Concentration$_{pellet}$ − Concentration$_{fabric}$) * 100/Concentration$_{pellet}$

TABLE 9

Comparison of fabric softness of neat and plasticized znPP-1 with and without slip agent

| SHF-101 (wt %) | Oleamide (wt %) | Handle-O-Meter (g) | Through-put (ghm) | B.W. (gsm) | Upper Calender Temp. (F.) | Lower Calender Temp. (F.) | Fiber Diameter (μm) | MD Peak Load (lb) | TD Peak Load (lb) | MD Peak Elong. % | TD Peak Elong. % |
|---|---|---|---|---|---|---|---|---|---|---|---|
| 0 | 0 | 43 | 0.2 | 35 | 275 | 272 | 14.2 | 14 | 7 | 90 | 101 |
| 5 | 0 | 27 | 0.2 | 35 | 276 | 274 | 16.1 | 14 | 7 | 101 | 103 |
| 0 | 0.2 | 32 | 0.2 | 35 | 276 | 273 | 15.2 | 13 | 6 | 75 | 84 |
| 5 | 0.2 | 20 | 0.2 | 35 | 276 | 274 | 15.1 | 13 | 8 | 89 | 112 |
| 0 | 0 | 44 | 0.3 | 35 | 276 | 273 | 15.1 | 14 | 7 | 94 | 96 |
| 5 | 0 | 27 | 0.3 | 35 | 276 | 274 | 16.0 | 13 | 8 | 107 | 120 |
| 0 | 0.2 | 39 | 0.3 | 35 | 276 | 274 | 15.5 | 13 | 7 | 77 | 85 |
| 5 | 0.2 | 21 | 0.3 | 35 | 276 | 274 | 16.5 | 12 | 7 | 98 | 113 |
| 0 | 0 | 39 | 0.4 | 35 | 276 | 274 | 17.4 | 11 | 6 | 79 | 81 |
| 5 | 0 | 24 | 0.4 | 35 | 276 | 274 | 17.2 | 11 | 7 | 82 | 84 |
| 0 | 0.2 | 32 | 0.4 | 35 | 276 | 274 | 17.2 | 10 | 5 | 58 | 79 |
| 5 | 0.2 | 19 | 0.4 | 35 | 276 | 274 | 16.7 | 10 | 6 | 75 | 97 |

TABLE 10

Comparison of fabric softness of neat and plasticized RCP-1 with and without slip agent

| SHF-101 (wt %) | Oleamide (wt %) | Handle-O-Meter (g) | Through-put (ghm) | B.W. (gsm) | Upper Calender Temp. (F.) | Lower Calender Temp. (F.) | Fiber Diameter (μm) | MD Peak Load (lb) | TD Peak Load (lb) | MD Peak Elong. % | TD Peak Elong. % |
|---|---|---|---|---|---|---|---|---|---|---|---|
| 0 | 0 | 25 | 0.2 | 35 | 261 | 259 | 15.9 | 9 | 7 | 56 | 84 |
| 5 | 0 | 17 | 0.2 | 35 | 260 | 258 | 15.4 | 8 | 5 | 54 | 65 |
| 5 | 0.2 | 14 | 0.2 | 35 | 260 | 259 | 14.4 | 7 | 5 | 46 | 68 |
| 0 | 0 | 25 | 0.3 | 35 | 261 | 259 | 15.5 | 11 | 8 | 67 | 84 |
| 5 | 0 | 16 | 0.3 | 35 | 260 | 258 | 15.4 | 7 | 6 | 53 | 74 |
| 5 | 0.2 | 14 | 0.3 | 35 | 260 | 259 | 14.9 | 8 | 5 | 57 | 70 |
| 0 | 0 | 22 | 0.4 | 35 | 260 | 258 | 16.6 | 10 | 7 | 71 | 86 |
| 5 | 0 | 15 | 0.4 | 35 | 260 | 259 | 16.7 | 8 | 5 | 67 | 70 |
| 5 | 0.2 | 14 | 0.4 | 35 | 260 | 259 | 17.3 | 8 | 5 | 69 | 63 |

TABLE 11

Comparison of fabric softness of neat and plasticized mPP-2 with and without slip agent

| SHF-101 (wt %) | Oleamide (wt %) | Handle-O-Meter (g) | Through-put (ghm) | B.W. (gsm) | Upper Calender Temp. (F.) | Lower Calender Temp. (F.) | Fiber Diameter (μm) | MD Peak Load (lb) | TD Peak Load (lb) | MD Peak Elong. % | TD Peak Elong. % |
|---|---|---|---|---|---|---|---|---|---|---|---|
| 0 | 0 | 38 | 0.2 | 35 | 260 | 256 | 15.1 | 13 | 7 | 107 | 104 |
| 5 | 0 | 22 | 0.2 | 35 | 260 | 257 | 14.7 | 11 | 7 | 98 | 105 |
| 5 | 0.2 | 17 | 0.2 | 35 | 260 | 256 | 14.4 | 10 | 6 | 83 | 98 |
| 0 | 0 | 40 | 0.3 | 35 | 260 | 257 | 15.8 | 12 | 7 | 86 | 80 |
| 5 | 0 | 24 | 0.3 | 35 | 260 | 257 | 15.2 | 10 | 7 | 71 | 88 |
| 5 | 0.2 | 19 | 0.3 | 35 | 260 | 256 | 15.1 | 11 | 7 | 83 | 100 |
| 0 | 0 | 45 | 0.4 | 35 | 260 | 257 | 16.7 | 10 | 6 | 67 | 71 |
| 5 | 0 | 26 | 0.4 | 35 | 260 | 257 | 16.3 | 10 | 6 | 80 | 82 |
| 5 | 0.2 | 15 | 0.4 | 35 | 260 | 256 | 16.1 | 9 | 6 | 75 | 92 |

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the scope of the present invention. Further, certain features of the present invention are described in terms of a set of numerical upper limits and a set of numerical lower limits. It should be appreciated that ranges formed by any combination of these limits are within the scope of the invention unless otherwise indicated.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

The invention claimed is:

1. A fiber comprising a condrapable polyolefin composition comprising:
   i. 40 to 99.99 wt % of blend of a polypropylene homopolymer and a copolymer, wherein the copolymer has:
      (a) 75-95 wt % of propylene-derived units;
      (b) 5-25 wt % of ethylene-derived units;
      (c) a melting temperature (Tm) of 25° C. to 110° C.;
      (d) a heat of fusion between 1.0 to 50.0 J/g; and
      (e) an mm triad tacticity of 75% or greater; wherein the wt % is based upon the weight of the homopolymer, copolymer, and the NFP, and
   ii. functionalized slip agent; and
   iii. a non-functionalized plasticizer (NFP), wherein the NFP is selected from polyalphaolefins comprising oligomers or polymers of $C_5$ to $C_{14}$ olefins, gas-to-liquid hydrocarbon, Group III mineral oils, or a combination thereof, having (1) a VI of 120 or more, (2) a flash point greater than 200° C., (3) a pour point of −20° C. or less, (4) a specific gravity of less than 0.86, and
   wherein ethylene homopolymers and copolymers having a weight average molecular weight of from 500 to 10,000 are substantially absent from the composition.

2. The fiber of claim 1, wherein the copolymer has 8-20 wt % of ethylene-derived units.

3. The fiber of claim 1, wherein the copolymer has a heat of fusion of 1.0 to 25 J/g.

4. The fiber of claim 1, wherein the copolymer has an mm triad tacticity of 80% or greater.

5. The fiber of claim 1, wherein the copolymer has a molecular weight distribution of from 1.5 to 4.5.

6. The fiber of claim 1, wherein the slip agent comprises a hydrocarbon having one or more functional groups selected from hydroxide, aryls and substituted aryls, halogens, alkoxys, carboxylates, esters, carbon unsaturation, acrylates, oxygen, nitrogen, carboxyl, sulfate and phosphate.

7. The fiber of claim 1, wherein the slip agent is selected from esters, amides, alcohols and acids of aromatic and aliphatic hydrocarbon oils.

8. The fiber of claim 1, wherein the slip agent comprises a fatty amide or ethylenebis(amide).

9. The fiber of claim 1, wherein the slip agent comprises a fatty amide of the formula:

$$RC(O)NHR^1$$

where R is a saturated or unsaturated alkyl group having from 7 to 26 carbon atoms, and $R^1$ is independently hydrogen or a saturated or unsaturated alkyl group having from 7 to 26 carbon atoms.

10. The fiber of claim 1, wherein the slip agent comprises an ethylenebis(amide) of the formula:

$$RC(O)NHCH_2CH_2NHC(O)R$$

where each R is independently a saturated or unsaturated alkyl group having from 7 to 26 carbon atoms.

11. The fiber of claim 1, wherein the slip agent comprises from 0.05 to 0.5 weight percent of the composition by weight of the copolymer and NFP.

12. The fiber of claim 1, wherein the non-functionalized plasticizer comprises an oligomer of decene having a carbon number of 40-200.

13. The fiber of claim 1, wherein the non-functionalized plasticizer comprises a linear or branched paraffinic hydrocarbon composition having a number average molecular weight of 500 to 20,000, having less than 10% sidechains having 4 or more carbons, and having at least 1 or 2 carbon branches present at 15 weight % or more, and wherein the NFP comprises less than 2 weight % cyclic paraffins.

14. The fiber of claim 1, where the non-functionalized plasticizer has a glass transition temperature (Tg) that cannot be determined or if it can be determined then the Tg is less than 30° C.

15. The fiber of claim 1, where the non-functionalized plasticizer has a distillation range having a difference between the upper temperature and the lower temperature of 20° C. or less.

16. The fiber of claim 1, where the non-functionalized plasticizer has an initial boiling point greater than 110° C.

17. The fiber of claim 1, where the non-functionalized plasticizer has a pour point of −25° C. or less.

18. The fiber of claim 1, where the non-functionalized plasticizer has a specific gravity of less than 0.85.

19. The fiber of claim 1, where the non-functionalized plasticizer has a final boiling point of from 115° C. to 500° C.

20. The fiber of claim 1, where the non-functionalized plasticizer has a weight average molecular weight between 100 and 21,000 g/mol.

21. The fiber of claim 1, where the non-functionalized plasticizer has a flash point of 210 to 350° C.

22. The fiber of claim 1, where the non-functionalized plasticizer has a viscosity of from 0.5 to 20 cSt at 25° C.

23. The fiber of claim 1, where non-functionalized plasticizer is present at 1 to 15 weight %, based upon the weight of the copolymer and the non-functionalized plasticizer.

24. The fiber of claim 1, where the fiber is spunbonded.

25. The fiber of claim 1, where the fiber is meltblown.

26. A nonwoven article comprising the fiber of claim 1.

27. The article of claim 26, where the article is a surgical gown or drape.

28. The article of claim 26, where the article is selected from diapers, sanitary napkins, training pants, adult incontinence products, hospital gowns, baby wipes, moist towelettes, and cleaner cloths.

29. The article of claim 26, where the article is selected from the group consisting of: yarns, woven fabrics, nonwoven fabrics, hook and loop fasteners, fabrics, garments, clothing, medical garments, surgical gowns, surgical drapes, diapers, training pants, sanitary napkins, panty liners, incontinent wear, bed pads, bags, packaging material, packages, swimwear, body fluid impermeable backsheets, body fluid impermeable layers, body fluid permeable layers, body fluid permeable covers, absorbents, tissues, nonwoven composites, liners, cloth linings, scrubbing pads, face masks, respirators, air filters, vacuum bags, oil and chemical spill sorbents, thermal insulation, first aid dressings, medical wraps, fiberfill, outerwear, bed quilt stuffing, furniture padding, filter media, scrubbing pads, wipe materials, hosiery, automotive seats, upholstered furniture, carpets, carpet backing, disposable wipes, diaper coverstock, gardening fabric, geomembranes, geotextiles, sacks, housewrap, vapor barriers, breathable clothing, envelopes, tamper evident fabrics, protective packaging, and coasters.

\* \* \* \* \*